(12) United States Patent
Lisec et al.

(10) Patent No.: US 11,040,325 B2
(45) Date of Patent: Jun. 22, 2021

(54) APPARATUS HAVING A MULTITUDE OF PARTICLES AND METHOD FOR MANUFACTURING THE SAME

(71) Applicant: Fraunhofer-Gesellschaft zur Foerderung der angewandten Forschung e.V., Munich (DE)

(72) Inventors: Thomas Lisec, Itzehoe (DE); Steffen Chemnitz, Kiel (DE); Bernhard Wagner, Looft (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 714 days.

(21) Appl. No.: 15/728,167

(22) Filed: Oct. 9, 2017

(65) Prior Publication Data
US 2018/0029002 A1   Feb. 1, 2018

Related U.S. Application Data

(63) Continuation of application No. PCT/EP2016/057659, filed on Apr. 7, 2016.

(30) Foreign Application Priority Data

Apr. 9, 2015   (DE) .................... 10 2015 206 377.1

(51) Int. Cl.
*B01D 53/02*   (2006.01)
*B01J 19/00*   (2006.01)

(52) U.S. Cl.
CPC .... *B01J 19/0093* (2013.01); *B01J 2219/0079* (2013.01); *B01J 2219/00783* (2013.01);
(Continued)

(58) Field of Classification Search
CPC .......... B01J 19/0093; B01J 2219/00783; B01J 2219/0079; B01J 2219/00824;
(Continued)

(56) References Cited

U.S. PATENT DOCUMENTS

| 4,620,248 A | * | 10/1986 | Gitzendanner | ...... G11B 23/507 |
| | | | | 236/44 R |
| 6,475,270 B1 | * | 11/2002 | Graeve | ................ B01D 53/268 |
| | | | | 55/385.6 |

(Continued)

FOREIGN PATENT DOCUMENTS

| CN | 1058298 A | 1/1992 |
| EP | 2055374 A2 | 5/2009 |

(Continued)

OTHER PUBLICATIONS

Alfeeli, B. et al., "Micro preconcentrator with embedded 3D pillars for breath analysis applications", Proc. SENSORS 2008, Leece, Italy, Oct. 26-29, 2008, Oct. 26, 2008, pp. 736-739.
(Continued)

*Primary Examiner* — Christopher P Jones
(74) *Attorney, Agent, or Firm* — Perkins Coie LLP; Michael A. Glenn

(57) ABSTRACT

An apparatus includes a substrate having a recess and a multitude of particles arranged in the recess. A first portion of the particles is joined to a porous structure by means of a coating. A second portion of the particles is not joined by means of the coating. The first portion of the particles is arranged closer to an opening of the recess than the second portion of the particles so that a leaking of the second portion of the particles from the recess through the opening is prevented.

32 Claims, 13 Drawing Sheets

(52) U.S. Cl.
CPC ............... *B01J 2219/00824* (2013.01); *B01J 2219/00831* (2013.01); *B01J 2219/00833* (2013.01); *B01J 2219/00835* (2013.01); *B01J 2219/00844* (2013.01); *B01J 2219/00849* (2013.01); *B01J 2219/00853* (2013.01); *B01J 2219/00873* (2013.01); *B01J 2219/00885* (2013.01); *B01J 2219/00907* (2013.01); *B01J 2219/00918* (2013.01); *B01J 2219/00952* (2013.01)

(58) Field of Classification Search
CPC .... B01J 2219/00831; B01J 2219/00833; B01J 2219/00835; B01J 2219/00844; B01J 2219/00849; B01J 2219/00853; B01J 2219/00873; B01J 2219/00885; B01J 2219/00907; B01J 2219/00918; B01J 2219/00952
See application file for complete search history.

(56) References Cited

U.S. PATENT DOCUMENTS

| | | | | |
|---|---|---|---|---|
| 7,297,271 | B2* | 11/2007 | Onishi | B01D 39/2034 210/510.1 |
| 7,306,659 | B2* | 12/2007 | Gorton | B01D 46/0032 360/97.17 |
| 7,591,868 | B2* | 9/2009 | Johnson | B01D 53/0415 360/97.16 |
| 8,128,885 | B2 | 3/2012 | Schwanke et al. | |
| 8,254,055 | B2* | 8/2012 | Brown | G11B 33/1453 360/97.12 |
| 2006/0140843 | A1 | 6/2006 | Sung et al. | |
| 2006/0144770 | A1 | 7/2006 | Granger et al. | |
| 2006/0188688 | A1* | 8/2006 | Sasaki | B01J 20/103 428/68 |
| 2007/0134939 | A1 | 6/2007 | Brueck et al. | |
| 2007/0172557 | A1* | 7/2007 | Simpson | A23L 3/3436 426/106 |
| 2008/0257151 | A1* | 10/2008 | Mayer | B01D 53/261 95/90 |
| 2014/0023849 | A1 | 1/2014 | Lisec et al. | |

FOREIGN PATENT DOCUMENTS

| | | |
|---|---|---|
| GB | 2337332 A | 11/1999 |
| WO | 2012104106 A1 | 8/2012 |
| WO | 2015081294 A2 | 6/2015 |

OTHER PUBLICATIONS

Merz, P. et al., "PSM-X2: Polysilicon surface micromachining process platform for vacuum-packaged sensors", Konferenzband Mikrosystemtechnik-Kongress 2005, Freiburg, Germany, Oct. 15-17, 2005, Oct. 15, 2005, pp. 467-470.

Saharil, F. et al., "Dry transfer bonding of porous silicon membranes to OSTE+ polymer microfluidic devices", Proc. MEMS 2012, Paris, France, Jan. 29-Feb. 2, 2012, Jan. 29, 2012, pp. 232-234.

Seo, J. H. et al., "Thermal desorption/injection characterization of a microfabricated passive preconcentrator/injector for micro gas chromatography", Proc. ITHERM 2012, San Diego, CA, US, May 30-Jun. 1, 2012, May 30, 2012.

Suzuki, Y. et al., "Development of micro catalytic combustor with Pt/Al2O3 thin films", JSME, B, vol. 47, No. 3, 2004, pp. 522-527.

Takatsuki, K. et al., "MEMS LC microchip with low dispersion and low pressure drop turn structure using distribution controlled micro pillar array", Proc. MEMS 2013, Taipei, Taiwan, Jan. 20-24, 2013, Jan. 20, 2013, pp. 981-984.

\* cited by examiner

APPARATUS HAVING A MULTITUDE OF PARTICLES AND METHOD FOR MANUFACTURING THE SAME

CROSS-REFERENCE TO RELATED APPLICATIONS

This application is a continuation of copending International Application No. PCT/EP2016/057659, filed Apr. 7, 2016, which is incorporated herein by reference in its entirety, and additionally claims priority from German Application No. DE 10 2015 206 377.1, filed Apr. 9, 2015, which is incorporated herein by reference in its entirety.

The present invention relates to an apparatus having a multitude of particles and to a method for manufacturing the same. The present invention further relates to miniaturized reactors having a large inner surface for chemical or physical processes.

BACKGROUND OF THE INVENTION

Micro reactors, i.e., volumes in the range of microliters for performing chemical reactions or physical processes in miniaturized systems, are of significant interest for many applications. These include flow-through cells for synthesizing or detecting chemical compounds, for filtering or mixing gases or liquids, for selectively absorbing substances from gases or liquids, but also, e.g., fuel cells for power generation or containers with reactive substances which may be selectively activated. In many cases, as large an inner surface as possible has to be provided in a miniaturized hollow space having defined dimensions and default inlet openings and outlet openings.

Manufacturing porous ceramics or metals per se is industrially established. Many methods are known in this regard, ranging from sintering powders to the pyrolysis of ceramic polymer foams. What all methods have in common is that they involve temperatures of mostly well above 400° C. In addition, blanks of the porous material are created which, by further processing steps, first have to be brought into the shape a particular application may use and then have to be integrated into the hollow space. Both are not compatible with miniaturized systems.

Large surfaces for MEMS (microelectromechanical system) applications may be created by structuring silicon by means of dry-etching or the anodic oxidation of the same. FIG. 10 shows an array 1000 of columns 1002, e.g., as may be used as a chromatographic separating column. The array 1000 is composed of silicon and is manufactured by means of a DRIE (Deep Reactive Ion Etching, a method for creating deep geometrical structures in silicon by means of reactive ion etching) method up to a depth of 30 µm. Since the distance between the columns having a cross-sectional area of 3×3 µm² is only 2 µm, an increase in area by the factor 12 is achieved compared to a smooth channel of the same depth, e.g., as described in [1]. For example, the array 1000 is used as a separating column for a liquid-phase chromatography.

Larger surfaces may be achieved by electrochemical etching (anodic oxidation) of silicon in HF-based solutions (HF=fluorine (F)-hydrogen (H)). In [2], a silicon layer having vertical pores and a depth of 30 µm is manufactured in this way and is detached from the substrate. Subsequently, the membrane is integrated by adherence into a microfluidic system made of plastic.

Similarly, porous alumina layers (alumina=aluminum oxide) may be created by anodic oxidation of aluminum. [3] describes a catalyst consisting of an alumina layer with a thickness of 5 µm, which is coated with platinum and which is located in an Al tube with a diameter of 0.6 mm. The process of the catalytic combustion of butane studied in [3] is limited by the reaction speed on the surface. FIG. 11 shows a comparable MEMS structure made of silicon and glass, which is based on an etched channel lined with a porous alumina layer with a thickness of 2 µm. The MEMS structure shows a somewhat poorer performance than the Al tube because, for technical reasons, it was not possible to apply more than 2 µm of aluminum as the starting material for the catalyst in the miniaturized channel.

For inertial sensors, resonators and IR sensors (IR=infrared), often a vacuum has to be maintained in a closed MEMS cavity. For this purpose, getter layers are used which are introduced into corresponding depressions in the cap substrate by vapor deposition or sputtering. Subsequently, the cap substrate is joined to the sensor substrate by bonding, i.e., the individual MEMS cavities are hermetically closed. For example, a corresponding manufacturing process for polysilicon-based inertial sensors is described in [4] and is illustrated in FIG. 12. FIG. 12 shows a schematic cross-section through an inertial sensor 2000 having a getter layer 2008 inside of the MEMS cavity. The inertial sensor 2000 includes a sensor wafer having the free-standing, movable structure 2002, and the cap wafer 2006 having the getter layer 2008. A movement of the movable structure 2002 with respect to an electrode 2004 may be sensed. A getter layer 2008 is applied to a cap substrate 2006. A volume of the sensor is sealed by means of a bond connection 2010. Since the getter layer 2008 is just a few µm thick, the same occupies a large part of the MEMS cavity on the cap side. The same is applied just before the wafer bonding in order to prevent a degradation of the getter. In order to activate the getter, the wafer stack is deposited at temperatures of more than 200° C. after the bonding. During the tempering, a vacuum occurs in the hermetically closed MEMS cavity. The absorption capacity of the cold getter is rather low.

Miniaturized gas chromatographs may be of significant interest, e.g., for monitoring the room air in buildings. However, the performance of such systems is considerably limited by the short length of the separating column. For this reason, a so-called pre-concentrator is placed in front of the column, e.g., as described in [5] and shown in FIGS. 13a-c. FIG. 13a shows a schematic block circuit diagram of a miniaturized gas chromatograph. FIG. 13b shows a schematic cross-section for illustrating an absorption of a gaseous substance 3002. FIG. 13c shows a schematic cross-section of the functional principle of the release of the previously adsorbed gaseous substance 3002. The gas chromatograph 3000 includes a volume filled with one or several adsorbents 3006, which is circumflowed by the gas mixture to be examined (gaseous substance 3002) for a certain time in order to enrich the substances to be detected. Due to heating by means of a heating element 3004, the same are then released in a sudden manner and introduced into the separating column. Introducing powdery adsorbents into a very small volume is difficult. On the one hand, the volume has to be filled in an even manner; on the other hand, trickling out through an inlet or outlet has to be prevented. In [5], comparatively large adsorbent particles are therefore introduced into the still open cavity of the pre-concentrator. Instead of using large adsorbent particles, in [6], an adsorbent layer is introduced into the pre-concentrator structure by means of ink jet printing.

It is therefore desirable to have a concept for reactors enabling a high process speed and/or an efficient operation.

SUMMARY

According to an embodiment, an apparatus may have: a substrate having a recess; and a multitude of particles arranged in the recess; wherein a first portion of the particles is joined to a porous structure by means of a coating, and wherein a second portion of the particles is not joined by means of the coating; and wherein the first portion of the particles is arranged closer to an opening of the recess than the second portion of the particles so that a leaking of the second portion of the particles from the recess through the opening is prevented; wherein the particles of the second portion are configured to react with a fluid and/or to bind the fluid or a substance thereof; and wherein the second portion has a number of particles which is greater than a number of particles of the first portion by a factor of at least 1.1.

According to another embodiment, an apparatus may have: a substrate; a multitude of particles joined to a porous structure by means of a coating, the porous structure being immovably joined to the substrate; and a heating element configured to heat the multitude of particles; wherein the apparatus includes a heating body spaced apart from the substrate by the multitude of particles, wherein the heating element is arranged at the heating body and is configured to heat the heating body so that the heating body heats the multitude of particles or wherein the porous structure is at least partially covered by a thermally conductive layer, wherein the heating element is arranged at the thermally conductive layer and is configured to heat the multitude of particles by heating the thermally conductive layer.

According to another embodiment, an apparatus may have: a substrate; a multitude of particles joined to a porous structure by means of a coating, the porous structure being immovably joined to the substrate; and a heating element configured to heat the multitude of particles; wherein the heating element is enclosed by the multitude of particles.

According to another embodiment, a method for manufacturing an apparatus may have the steps of: providing a substrate having a recess; introducing a multitude of particles into the recess; coating a first portion of the multitude of particles so that the first portion is joined to a porous structure by using a coating process having a penetration depth proceeding from an opening of the recess along a depth direction into the recess; and wherein the penetration depth of the coating process into the recess is set such that a second portion of the particles is not joined by means of the coating and such that the first portion of the particles is arranged between the second portion of the particles and a surrounding area of the recess and such that a movement of the second portion of the particles towards the surrounding area of the recess is essentially prevented.

According to another embodiment, a method for manufacturing an apparatus may have the steps of: providing a substrate; arranging a multitude of particles at the substrate; coating the multitude of particles and the substrate so that the multitude of particles are at least partially coated and are joined to a porous structure and so that the porous structure is immovably joined to the substrate; and arranging a heating element so that an increase in temperature of the heating element heats the multitude of particles, arranging a heating body so that the same is spaced apart from the substrate by the multitude of particles so that the heating element is arranged at the heating body and is configured to heat the heating body so that the heating body heats the multitude of particles; or coating the porous structure at least partially with a thermally conductive layer so that the heating element is arranged at the thermally conductive layer and is configured to heat the multitude of particles by heating the thermally conductive layer.

According to another embodiment, a method for manufacturing an apparatus may have the steps of: providing a substrate; arranging a multitude of particles at the substrate; coating the multitude of particles and the substrate so that the multitude of particles is at least partially coated and is joined to a porous structure, and so that the porous structure is immovably connected to the substrate; and arranging a heating element so that an increase in temperature of the heating element heats the multitude of particles; and so that the heating element is enclosed by the multitude of particles.

It is one finding of the present invention to have recognized that the object of the invention may be solved by arranging a multitude of particles in a recess, the multitude of particles comprising a large total surface so that chemical or physical reactions may take place at the surface of the particles with a high speed. Joining a part of the particles to a porous structure enables preventing a leaking of the remaining particles so that the operation of the reactor is reproducibly and continuously ensured.

A further finding of the present invention is to have recognized that arranging a heating element adjacent to a multitude of particles joined to a porous structure by means of a coating enables an efficient heating which influences other regions of the apparatus only to a small extent, for triggering or accelerating a chemical or physical process so that the chemical or physical processes may take place with a high process speed.

According to an embodiment, an apparatus includes a substrate comprising a recess and a multitude of particles arranged in the recess. A first portion of the particles is joined to a porous structure by means of a coating. A second portion of the particles is not joined by means of the coating. The first portion of the particles is arranged closer to an opening of the recess than the second portion of the particles so that a leaking of the second portion of the particles from the recess through the opening is prevented. This enables reaction characteristics of the uncoated portion of the particles to be influenced by the coating only to a small extent or not at all. At the same time, a large surface and therefore a high process speed may be obtained by means of the arrangement of the particles. A medium which is to react with the multitude of the particles or under the aid of the same (catalyst) may reach the uncoated particles through this porous structure.

According to a further embodiment, the first portion of the particles includes a multitude of hollow spaces arranged between the particles of the first portion, which are at least partially joined to each other, the porous structure being immovably joined to the substrate. This embodiment is advantageous in that a medium may circumflow the first portion of the particles by means of the hollow spaces and, therefore, the porous structure in order to reach the uncoated particles.

According to a further embodiment, the opening of the recess borders on a cavity of the apparatus. The advantage of this is that the second portion of the particles may be kept in place by the first portion of the particles. With respect to the cavity of the apparatus, e.g., an inner volume, the second portion of the particles may be prevented from dropping out or trickling out.

According to a further embodiment, the multitude of particles includes a concentrator material configured to bind at least one substance from the surrounding area of the recess. The advantage of this is that the multitude of particles may be used as a pre-concentrator, wherein the multitude of particles, or their large surface, enable a large amount of the substance bound from the surrounding area. Thus, a substance bound by means of the pre-concentrator may be concentrated quickly and/or in a high concentration.

According to a further embodiment, the apparatus includes a substrate and a multitude of particles joined to a porous structure by means of a coating, the porous structure being immovably joined to the substrate. Further, the apparatus includes a heating element configured to heat the multitude of particles. The advantage of this is that, based on the heating by the heating element, chemical or physical processes may be triggered or at least supported or accelerated so that the process speed is further increased.

According to a further embodiment an apparatus includes a heating body spaced apart from the substrate by the multitude of particles, the heating element being arranged at the heating body and configured to heat the heating body so that the heating body heats the multitude of particles. The advantage of this embodiment is that an increase in temperature of the heating body may be provided to the particles to a large extent so that there is only a low increase in temperature of the surrounding substrate. In this way, a temperature influence with respect to neighboring structures may be decreased or prevented.

According to a further embodiment, an apparatus further includes a sensor element arranged adjacent to the multitude of particles and configured to sense a parameter of the multitude of particles, a parameter of a cavity of the apparatus and/or a parameter of a medium arranged between the multitude of particles. It is an advantage of this embodiment that process parameters of the process taking place at or adjacent to the particles may be sensed directly or indirectly so that a drive or a control of the processes may be accurately controlled.

According to a further embodiment, a method for manufacturing an apparatus includes providing a substrate comprising a recess and introducing a multitude of particles into the recess. The method further includes coating a portion of the multitude of particles so that the first portion is joined to a porous structure. Coating is effected by a coating process comprising a penetration depth proceeding from an opening of the recess into the recess. The penetration depth is set such that a second portion of the particles is not joined by means of the coating and such that the first portion of the particles is arranged between the second portion of the particles and a surrounding area of the recess and such that a movement of the second portion of the particles towards the surrounding area of the recess is essentially prevented. That is, the first portion of the particles may be arranged facing the opening of the recess.

According to a further embodiment, a method for manufacturing an apparatus includes providing a substrate, arranging a multitude of particles at the substrate and coating the multitude of particles and the substrate. The coating is performed such that the multitude of particles is at least partially coated and joined to a porous structure so that the porous structure is immovably joined to the substrate. The method further includes arranging a heating element so that an increase in temperature of the heating element heats the multitude of particles.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
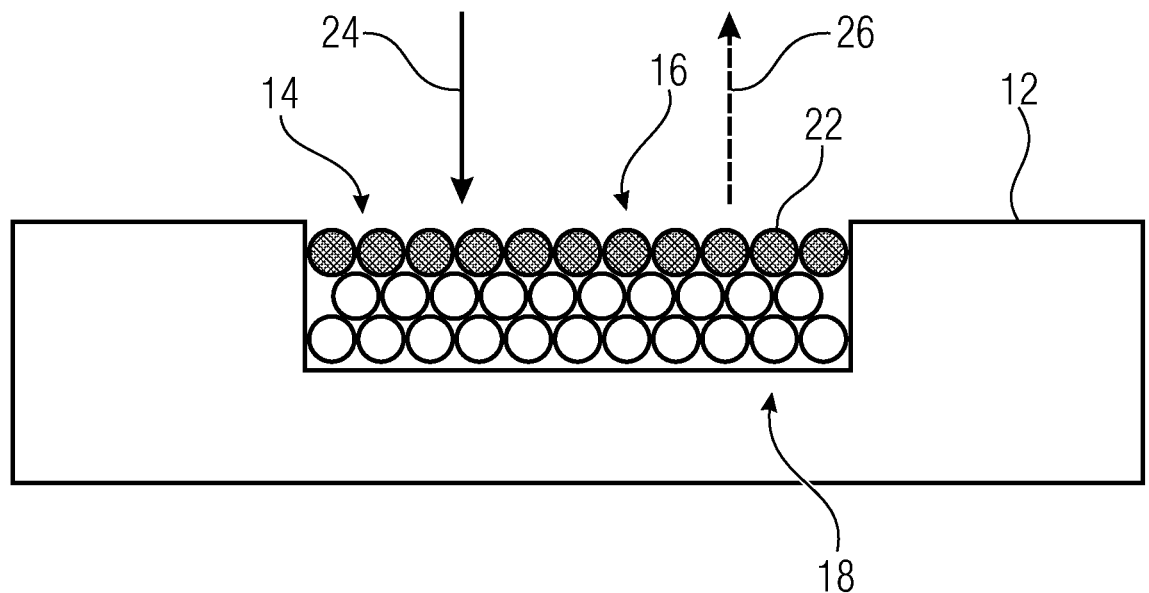
FIG. 1 shows a schematic sectional side view of an apparatus having a multitude of particles, according to an embodiment.

Before embodiments of the present invention will be subsequently explained in detail with reference to the drawings, it is pointed out that identical, functionally identical and operatively identical elements, objects and/or structures are provided in the different figures with identical reference numerals so that the description of these elements in different embodiments is interchangeable and/or mutually applicable.

Some of the embodiments described in the following relate to reactors for chemical or physical processes. For example, the reactors may be gas chromatographs or pre-concentrator elements of gas chromatographs. The reactors may also be filters configured to filter out substances contained in a medium flowing through the filter.

Furthermore, a reactor may refer to an apparatus for power generation (such as a battery), in which electric power is generated based on a surface reaction. Embodiments descried in the following further relate to reactors in the form of getter pumps configured to bind a fluid or substances thereof and to therefore reduce a fluid pressure or a substance concentration in a cavity so that, e.g., vacuum-like conditions or at least a reduced (partial) pressure are present in the cavity.

Fluids brought in connection or contact with the multitude of particles may have any state, advantageously a non-solid state, i.e., gaseous and/or liquid.

FIG. 1 shows a schematic sectional side view of an apparatus 10 comprising a substrate 12. The substrate 12 includes a recess 14 such as a blind hole, a trench or a depression. A multitude of particles is arranged in the recess 14. A first portion 16 of the particles is joined to a porous structure 22 by means of a coating. A second portion 18 of the particles is not joined by means of the coating.

The first portion 16 of the particles is arranged closer to an opening 19 of the recess 14 than the second portion 18 of the particles. A leaking of the second portion 18 of the particles from the recess through the opening 19 thereof is prevented by means of the porous structure 22, i.e., the first portion 16 of the particles. The porous structure 22 may be fixedly joined to the substrate 12, e.g., by the first portion 16 and the substrate 12 having the same coating, and by the coating joining the particles of the first portion 16 to each other and also the porous structure 22 to the substrate 12. Alternatively, it is also conceivable that the porous structure 22 is joined to the substrate 12 in a different manner, e.g., by a pressure method, a pressing method, or an adhering method.

The porous structure 22 is configured to allow a first fluid 24 to pass towards the second portion 18. For example, this takes place by the fact that the porous structure 22 comprises a multitude of hollow spaces at least partially joined to each other so that the fluid 24 may flow through the neighboring hollow spaces. The hollow spaces may be obtained by virtue of the fact that particles brought in contact to each other comprise hollows spaces arranged therebetween which remain at least partially opened due to the coating. Simply put, the fluid 24 may reach the second portion 18 of the particles through the porous structure 22.

The second portion 18 of the particles may include particles configured to react with the fluid 24 and/or to bind the fluid 24 or a substance thereof. If the fluid 24 is only partially bound by the particles, or a chemical or physical reaction takes place which changes the fluid 24, a second (possibly changed) fluid 26 may leave the recess 14 through the porous structure 22.

Alternatively, at least one further fluid may also flow through the porous structure 22 into the recess 14. For example, the fluid 24 and the further fluid may react at the particles, in particular at the particles of the second portion 18. Thus, a surface reaction at the particles of the second portion 18 is made possible. In addition, if the coating comprises corresponding materials, a surface reaction at the particles of the first portion 16 may be possible. Compared to a planar structure or a column structure, the surface at which the surface reaction may take place is increased based on the multitude of particles.

A reaction characteristic of the particles may be determined or influenced by a material and/or a surface characteristic of the particles. Alternatively or additionally, a corresponding material characteristic or surface characteristic may be influenced or enabled by the coating (however, in contrast, it may also be suppressed).

The multitude of particles, i.e., the particles of the first portion 16 joined to the porous structure 22 and possibly uncoated particles, may be further changed with respect to their reaction characteristics in further process steps. For example, catalytically active substances may therefore be brought up to the surface of the porous three-dimensional structure 22 from a solution or a gas phase in order to enable a catalyst function.

Coating of the first portion 16 may be performed by means of any appropriate method (coating process), e.g., atomic layer deposition (ALD), physical vapor deposition (PVD) or chemical vapor deposition (CVD). For example, in the course of a manufacturing method, a multitude of particles may be arranged into the recess 14, wherein the particles may be different but may also be similar. Subsequently, coating of the first portion 16 may take place by accordingly selecting the coating parameters or by finishing or cancelling the coating once a sufficient number of particles is coated so that the first portion 16 may form the porous structure 22. The coating process may comprise a penetration depth 21 which describes an effectiveness (coating of particles) of the coating process proceeding from the opening 19 along a depth direction 23 into the recess 14. Simply put, particles of the first portion 16 are essentially arranged at a distance to the opening 19 which is less than or equal to the penetration depth 21 of the coating process.

The particles of the second portion 18 may be arranged at a distance to the opening 19 which is larger than the penetration depth 21 of the coating process. Setting the penetration depth 21 may include setting a parameter of the coating process, e.g., pressure, time, temperature or the like. For example, setting the penetration depth 21 may take place such that a dwell time of a first or a second reactant may be set for an atomic layer deposition (coating process) such that the same penetrates particles from the opening 19, or a cover area (fill level) of the particles, only up to the penetration depth 21. For example, a coating takes place by virtue of the fact that both reactants (successively in sequence) come in contact with the particle and, for example, are deposited at the particle. For example, a reactant may be introduced, and portions not arranged at the particles may be removed (sucked out) before a further reactant is introduced. If both reactants come into contact with each other at the particles, a coating may be formed at this location. If the dwell time is set such that at least one of the reactants does not exceed the penetration depth 21, coating the particles comprising a larger distance to the opening 19 than the penetration depth 21 may be reduced or prevented. Alternatively, for example, a coating time of a CVD deposition may be set such that coating particles with a larger distance to the opening 19 than the penetration depth 21 is essentially or entirely prevented. For example, when using $Al_2O_3$, a "penetration depth" within which the particles are coated may be set in broad limits. Aspect ratios of above 1000 may be reached.

This means that a chemical or physical characteristic of the second portion 18 of the multitude of particles may remain essentially unchanged during a manufacturing method.

Coating may be performed proceeding from a side of the surrounding area of the recess 14 towards a volume of the recess. This makes it possibly that particles arranged adjacent to the opening 19 of the recess (the first portion 16) are coated while particles spaced apart from the opening 19 remain uncoated.

Compared to a number of particles of the first portion, a number of particles of the second portion may be larger by a factor of at least 1, 2, 10 or more. This means that more uncoated particles may be arranged than coated particles.

The porous structure 22 forms a porous membrane. An interaction of the second portion 18 of the particles with the fluid 24 (medium) is enabled by the porous structure 22. Due to the material of the substrate 12, a contact of the fluid 24 with second portion 18 of the particles may essentially be prevented, which means that a size of the opening 19 of the recess 14 may influence an entry and/or exit of mediums towards the uncoated particles.

For example, the substrate 12 may be a semiconductor material. For example, the semiconductor material may be a silicon material or a gallium-arsenide material. Alternatively or additionally, the substrate 12 may be a glass material, a ceramic material, a glass-ceramic material and/or a plastic material. The substrate 12 may comprise a doping. For example, the semiconductor material may be doped, e.g., with a boric material. For example, the substrate 12 is a MEMS wafer. The substrate 12 may comprise a planar or non-planar shape (e.g., a bent shape).

Figure 2:
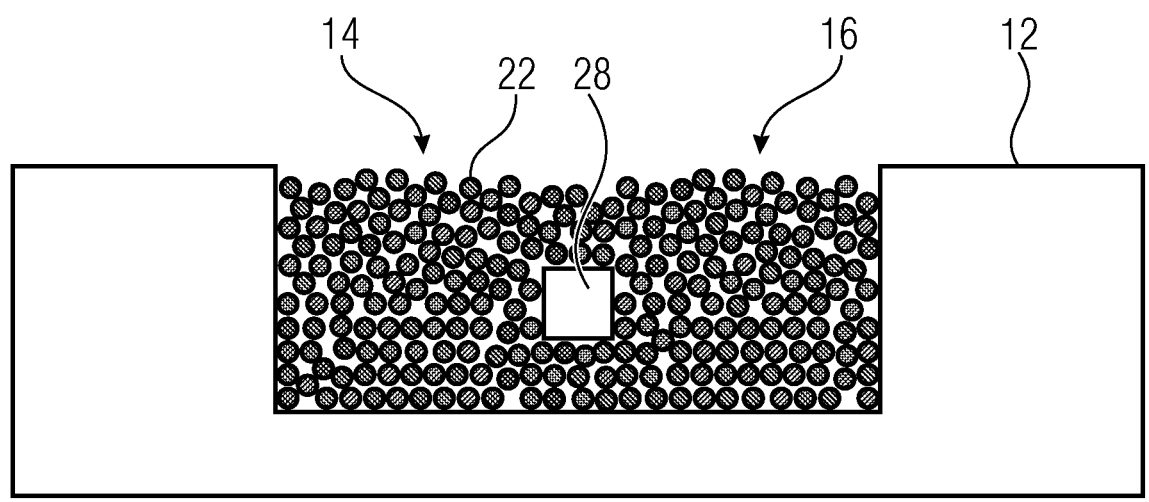
FIG. 2 shows a schematic sectional side view of an apparatus, in which almost all particles are coated, according to an embodiment.

FIG. 2 shows a schematic sectional side view of an apparatus 20, in which the first portion 16 of the particles arranged in the recess 14 includes all or almost all of the arranged particles. The apparatus 20 includes a heating element 28 configured to heat the multitude of the arranged particles. The heating element 28 may be enclosed by the particles. This makes it possible that a large portion of a surface of the heating element 28 may be in brought into contact with the particles and a large amount of heating energy is released to the particles 16 when the heating element 28 is activated. The heating element 28 may be arranged spaced apart from the substrate 12. This makes it possible that a direct release of heating energy of the heating element 28 to the substrate 12 is reused or prevented. This enables a low increase in temperature of the substrate 12 based on an activation of the heating element 28 so that a thermal influence on the substrate 12 as well as on neighboring structures is also low.

For example, if the first portion 16 is configured to be operated as a pre-concentrator, an apparatus may comprise several recesses (pre-concentrators), particles being arranged in each of the same. Each multitude of particles in a respective recess may be used as a pre-concentrator for a specific substance or a specific concentration of a substance, and may be heated independently from each other with a heating element in order to release the respectively enriched substance. Due to a reduced or low mutual thermal influence of the pre-concentrators, an accurate operation of the apparatus(es) may take place.

Although the apparatus 20 is described such that solely the first portion 16 of the particles is arranged, according to alternative embodiments, the second portion of the particles may also be arranged, as described in connection with FIG. 1.

An exemplary manufacturing method for manufacturing apparatuses is explained based on FIGS. 3a-e described in the following. In a first step, the substrate 12 is provided. Optionally, a conductive element 32 may be arranged at a side of the substrate 12, the conductive element 32 being configured to heat up when activated. For example, the conductive element 32 may be configured to heat up when an electric current flows through the same. For example, the conductive element 32 may be a structured metal such as copper, aluminum, gold or the like. Alternatively, the conductive element 32 may also be a doped or undoped semiconductor material. For example, the semiconductor material may be silicon or gallium arsenide (GaAs). For example, a doping may occur by means of boron.

Figure 3A:
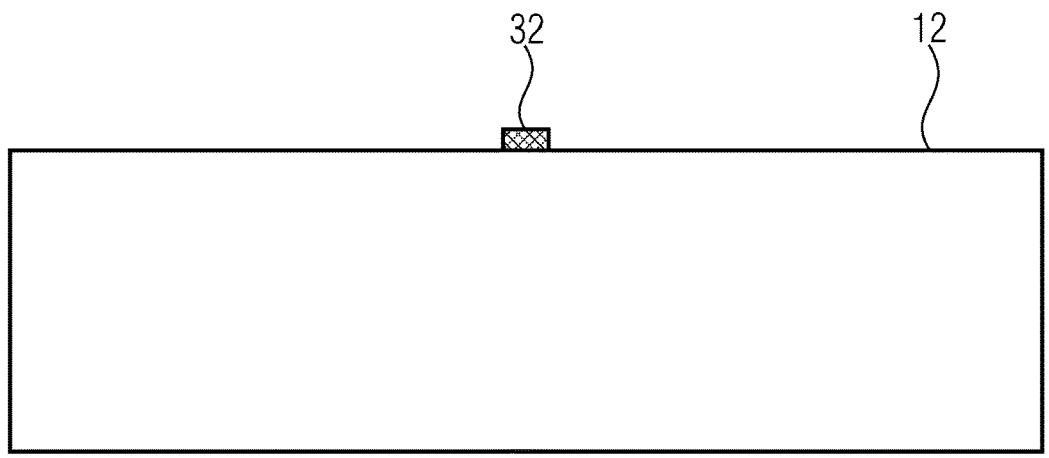
FIG. 3a shows a first schematic step of a method for manufacturing an apparatus, in which a substrate is provided, according to an embodiment.

Both the substrate and the electrically conductive element 32 (such as one or several conductor paths) may alternatively or additionally (temporally alternating or simultaneously) be used for measuring a temperature. For this purpose, the electrically conductive element may comprise a material with an appropriate temperature coefficient. In particular, metals such as gold or platinum are suitable in this regard. In other words, FIG. 3a shows a deposition and a structuring of one or several metals on a silicon substrate, which serve for electrically connecting the heater and/or as a temperature sensor.

Figure 3B:
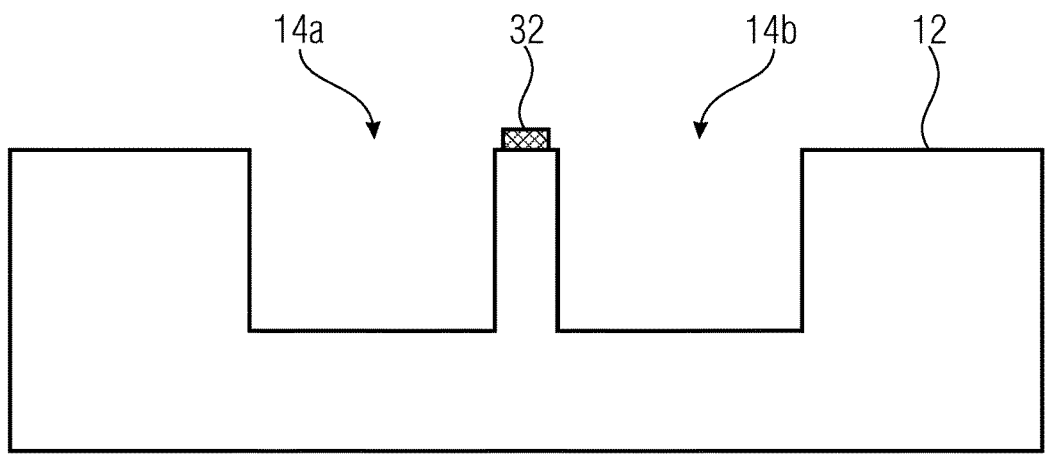
FIG. 3b shows a second schematic step of the method for manufacturing the apparatus, in which two recesses are arranged in the substrate, according to an embodiment.

FIG. 3b schematically shows a following arrangement of two recesses 14a and 14b in the substrate 12. Although the arrangement of two recesses 14a and 14b is shown in FIG. 3b, only one recess or, alternatively, more than two recesses may be arranged. In other words, FIG. 3b shows etching one or several cavities in the substrate, which predetermine(s) a shape and/or dimensions of the heating elements and of the three-dimensional body.

Figure 3C:
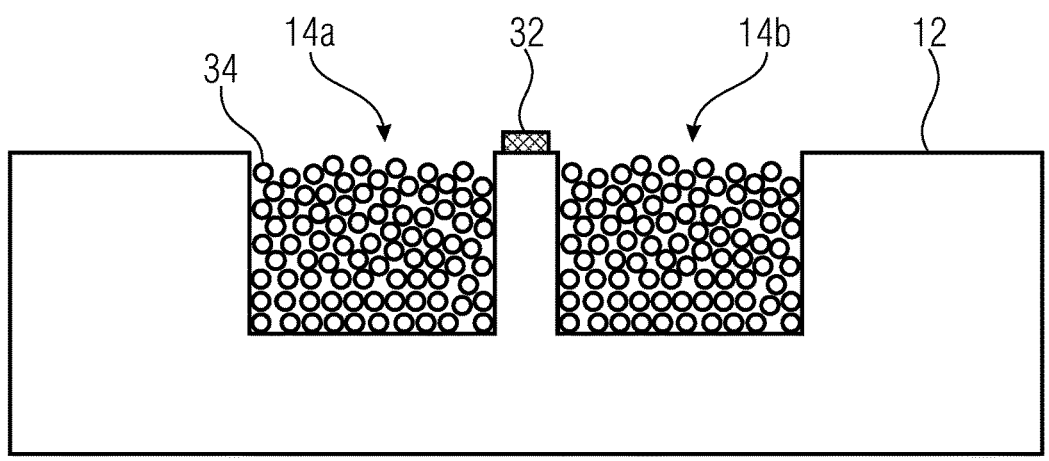
FIG. 3c shows a third schematic step of the method for manufacturing the apparatus, in which a multitude of particles is arranged into the cavities, according to an embodiment.

As illustrated in FIG. 3c, a first multitude of particles 34 is arranged into the cavity 14a, and a second multitude of particles 34 is arranged into the cavity 14b. Simply put, the substrate 12 comprises a further recess 14b in which a further multitude of particles is arranged. The particles arranged in the recesses 14a and 14b may comprise the same or different materials and/or may comprise the same or different shapes or sizes. In other words, FIG. 3c shows an introduction of the particles, which the three-dimensional body is to consist of, into the cavities. At this point in time, the particles may be arranged loosely at, or on, each other.

Figure 3D:
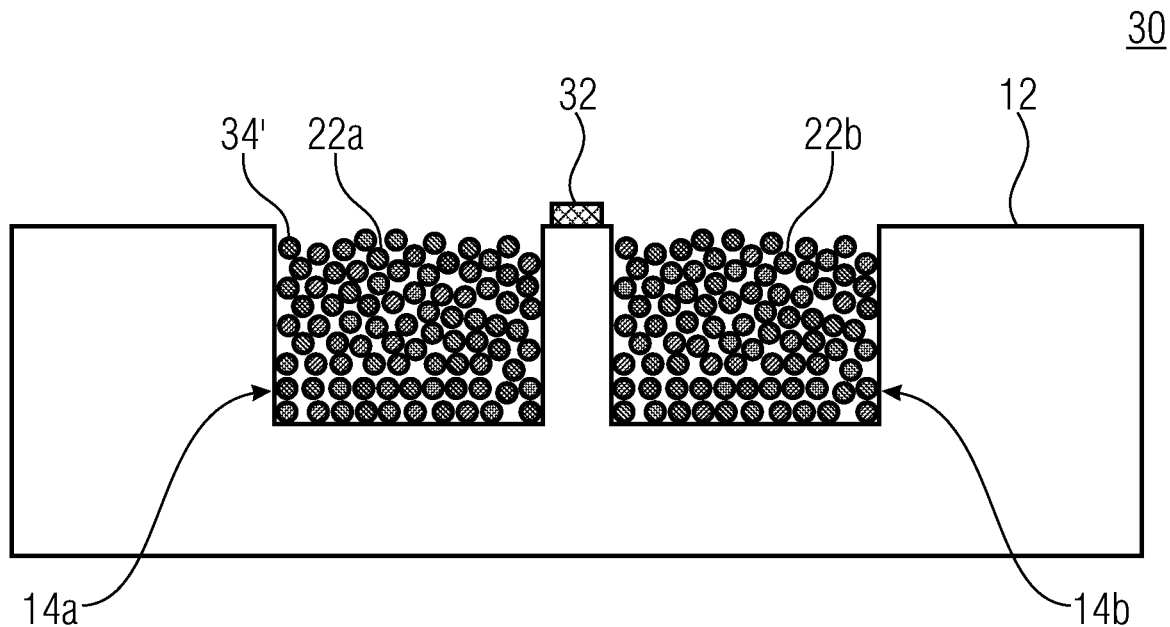
FIG. 3d shows a fourth schematic step of the method for manufacturing the apparatus, in which the particles are coated by means of coating, according to an embodiment.

As illustrated in FIG. 3d, the particles are coated by means of a coating, as indicated by the particles 34', which are illustrated in a dark manner (filled circle) with respect to FIG. 3c. An apparatus 30 includes the particles which form porous structures 22a and 22b arranged in the recesses 14a and 14b, respectively. In this case, the electrically conductive element 32 is arranged at a part of the substrate 12 which spaces the two recesses 14a and 14b apart are from each other. The porous structures 22a and 22b may each be joined to the substrate 12. In other words, FIG. 3d shows a solidification of the particles by means of coating, e.g., with $Al_2O_3$ by means of ALD. This layer may be removed from the regions of the metal structures (conductive element 32) which serve for the electric contacting of heaters and temperature sensors.

Figure 3E:
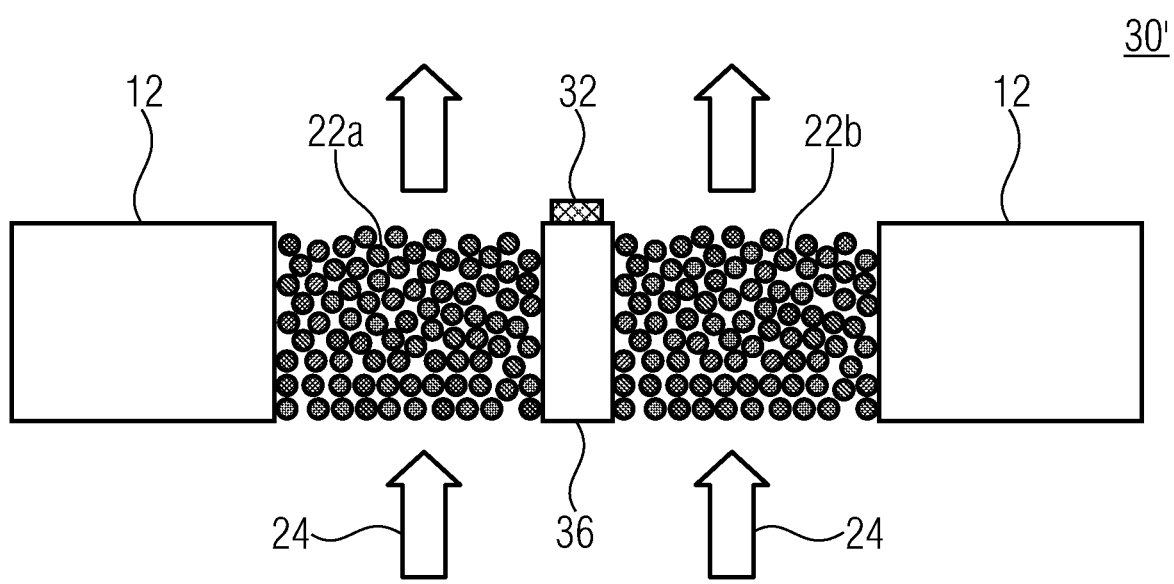
FIG. 3e shows a fifth schematic step of the method for manufacturing the apparatus in which the substrate is partially removed, according to an embodiment.

As illustrated in FIG. 3e, the substrate 12 may be partially removed so that the porous structures 22a and 22b are contact-free at two sides of the same with respect to the substrate 12. Hereby, the apparatus 30 is modified to an apparatus 30'. For example, the removed substrate may be a rear side of a wafer in which the apparatus is formed. In this case, the term "rear side" is not to have a restrictive effect. It is to be understood that, according to the spatial orientation of the apparatus, terms like "up", "down", "left" or "right" as well as the respective sides are arbitrarily exchangeable. Simply put, a second opening is created at the recess 14a and at the recess 14b so that the fluid 24 may flow through the porous structures 22a and 22b. For example, partially removing the substrate 12 may lead to the fact that a part 36 of the substrate 12 is exposed with respect to the remaining substrate 12.

The remaining part 36 may be referred to as a heating body when the electrically conductive element 32 is configured to, based on an electric current flowing through the electrically conductive element 32, release heat energy. Removing the substrate 12 further enables an electric insulation of the heating body 36 and, therefore, of the conductive element 32 from the substrate 12. Activating the conductive element 32 may lead to an increase in temperature of the heating body 36 which is configured to receive heat energy from the electrically conductive element 32 and to release the same to the porous structures 22a and 22b. Thus, the heating body 36 and the electrically conductive element 32 are arranged spaced apart from the remaining substrate 12 by means of the porous structures 22a and 22b. Simply put, the heating element 32 is arranged with respect to the particles, i.e., is configured to heat the multitude of particles (porous structures 22a and 22b) by means of the heating body 36. An increase in temperature of the particles is larger than an increase in temperature of the substrate. As described in connection with FIG. 2, the heating element may also be arranged with respect to the multitude of particles such that the same is in direct contact with the particles and directly heats the particles.

Alternatively, it is also conceivable that the porous structures 22a and 22b are an integral element, e.g., when the heating body 36 is an island structure enclosed by the particles of the porous structure. In other words, FIG. 3a shows a removal of the silicon from the rear side of the substrate, e.g., by grinding and/or polishing until the porous three-dimensional structure (porous structure) is exposed so that a fluid may flow through the three-dimensional structure from one side to the other side (e.g., from top to bottom or vice versa). In summary, FIGS. 3a-e show a manufacturing of a porous three-dimensional (3D) structure with embedded heaters, or temperature sensors, on a silicon substrate.

The heating body 36 may consist of the substrate material itself, and is, for example, predetermined in its lateral dimensions upon etching the cavity for the particles to be introduced. Pads and/or conductor paths made from conductive material (such as metal) are arranged on the substrate 12 for electrically contacting the heater. Arranging the same may take place before etching or after etching. Finally, the silicon may be removed starting from the rear side, as illustrated in FIG. 3e. In this way, on the one hand, it is made possible that the fluid 24 may flow through the porous 3D structure along a direction (e.g., perpendicular). On the other hand, the heating element embedded in the 3D structure (porous structure 22) is thermally and electrically separated from the substrate 12.

Figure 4A:
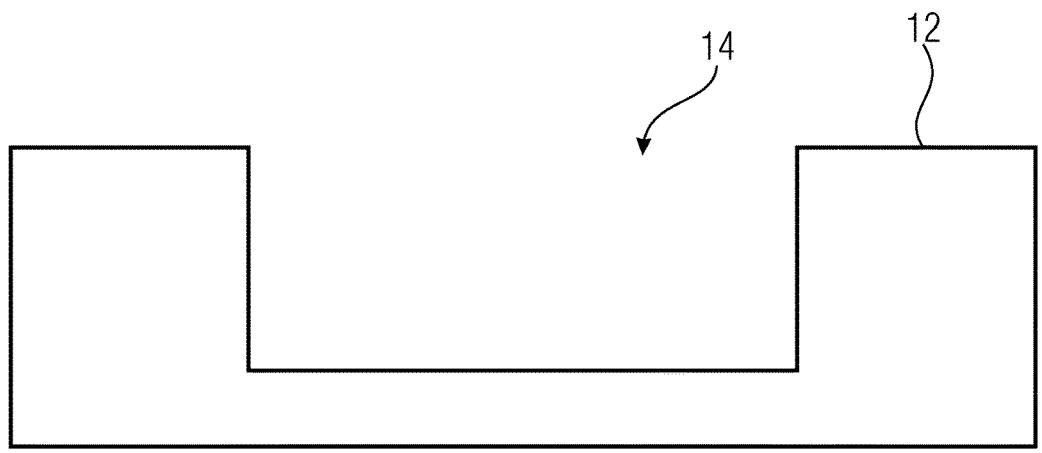
FIG. 4a shows a first schematic step of a further method for manufacturing an apparatus, in which a recess is formed into the substrate 12, according to an embodiment.
Figure 4B:
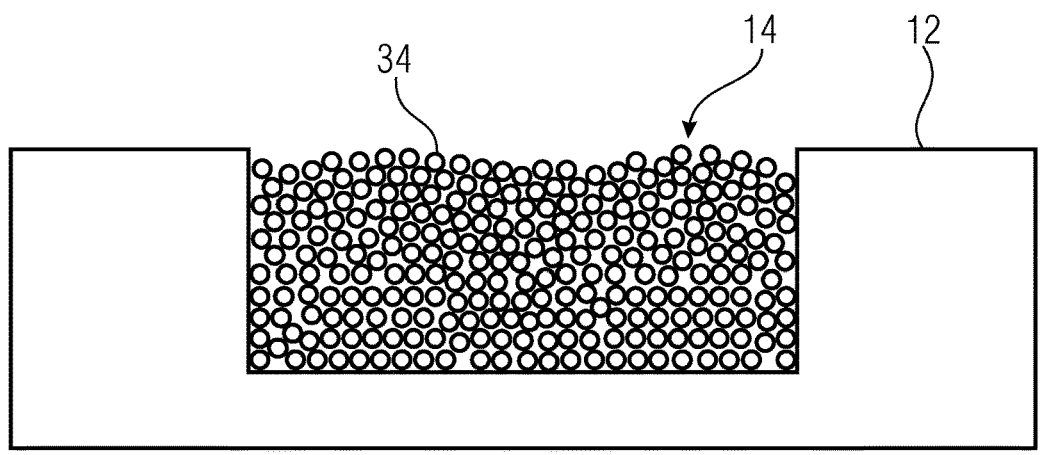
FIG. 4b shows a second schematic step of the method for manufacturing the apparatus, in which particles are arranged into the recess 14, according to an embodiment.
Figure 4C:
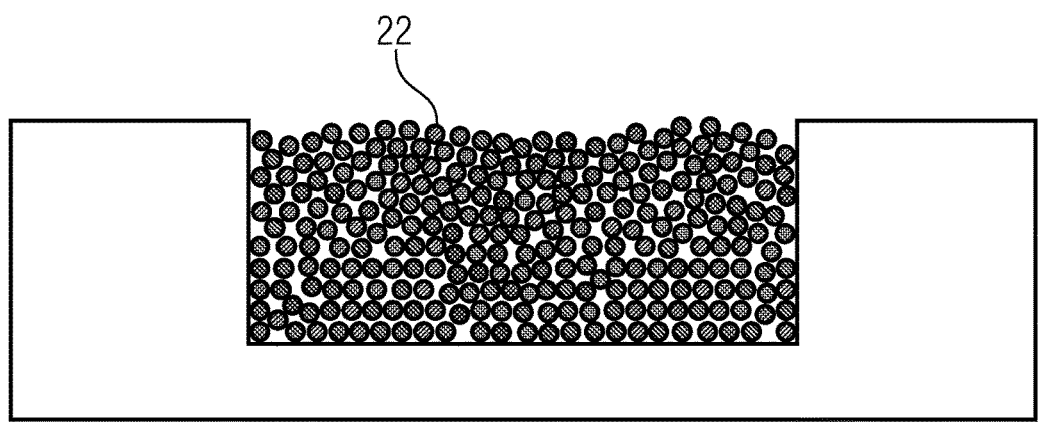
FIG. 4c shows a third schematic step of the method for manufacturing the apparatus, in which a porous structure is obtained by means of coating the particles, according to an embodiment.

FIGS. 4a-f schematically show a method for manufacturing an apparatus 40. As illustrated in FIG. 4a, the recess 14 is formed into the substrate 12, e.g., by means of an etching process. Subsequently, as illustrated in FIG. 4b, particles 34 which are possibly loose are arranged into a recess 14. As illustrated in FIG. 4c, the porous structure 22 is obtained by means of coating the particles.

Figure 4D:
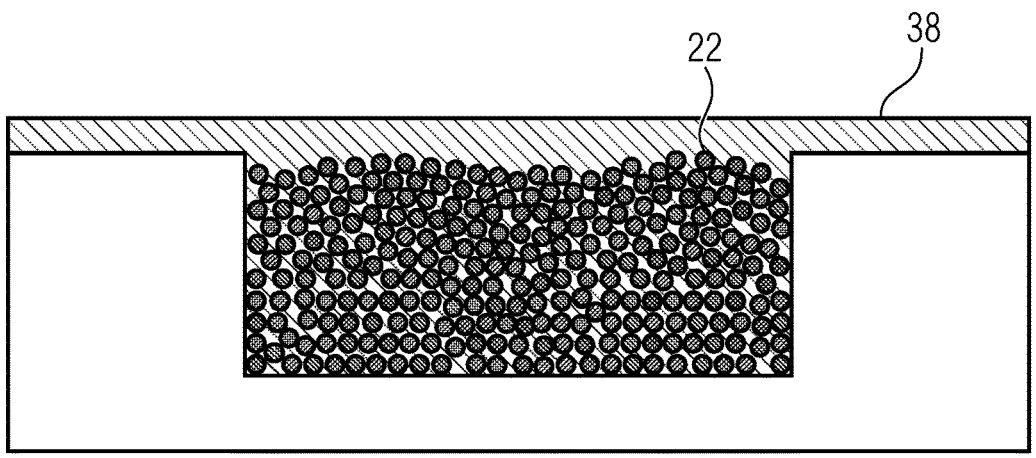
FIG. 4d shows a fourth schematic step of the method for manufacturing the embodiment, in which a material layer is arranged at the porous structure, according to an embodiment.

As illustrated in FIG. 4d, a material layer 38 extending in a flat manner across the porous structure 22 is arranged at the opening of the recess at the porous structure 22. A side of the material layer 38 facing away from the porous structure 22 comprises a decreased unevenness compared to the porous structure 22. Simply put, the side of the material layer 38 facing away from the porous structure 22 is flat. The material layer 38 may be arranged appropriate by means of appropriate molding or deposition methods. The material layer 38 arranged may be processed with a subsequent treatment such as a grinding process or a polishing process, such that the same comprises a low surface roughness. The material layer 38 may include electrically insulating materials such as a resin or an undoped semiconductor material. Alternatively or additionally, the material layer 38 may include a plastic. This enables obtaining a passivating characteristic of the material layer 38.

Figure 4E:
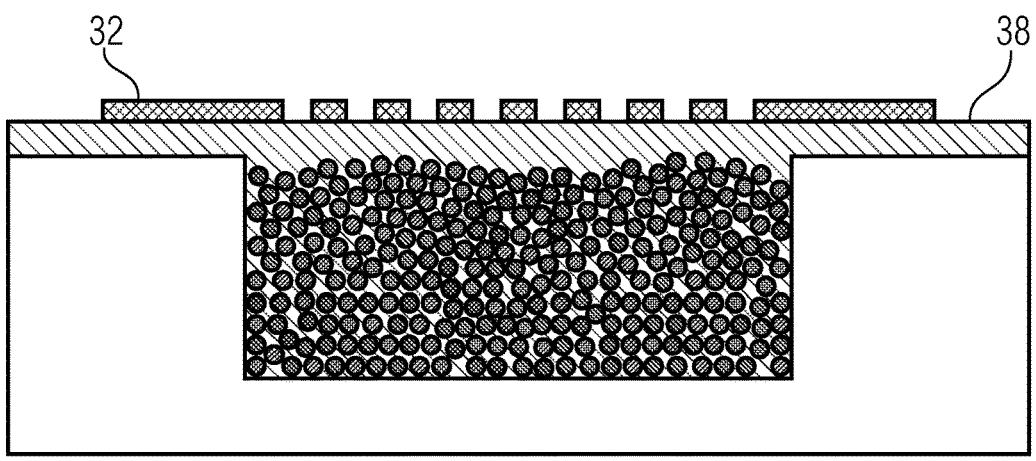
FIG. 4e shows a fifth schematic step of the method for manufacturing the apparatus, in which one or several electrically conductive elements are arranged at the material layer, according to an embodiment.

As illustrated in FIG. 4e, one or several electrically conductive elements 32 may be arranged at the material layer 38. In other words, FIG. 4e shows a deposition and a structuring of one or more metals on the planarized 3D structure, wherein the metal(s) may be used as a heating element and/or as a temperature sensor.

Figure 4F:
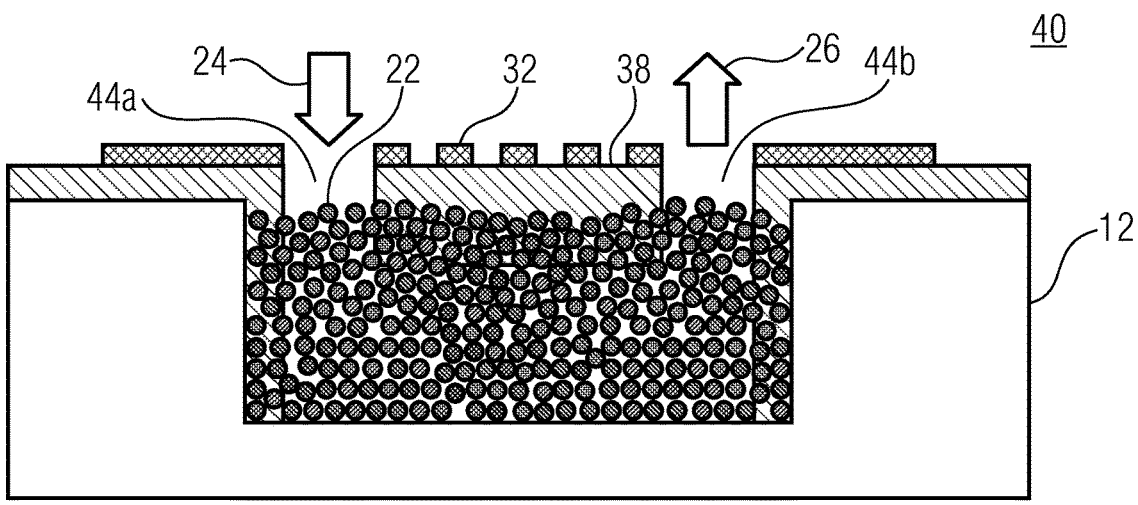
FIG. 4f shows a sixth schematic step of the method for manufacturing the apparatus, in which fluidic terminals are manufactured, according to an embodiment.

Subsequently, as illustrated in FIG. 4f, fluidic terminals 44a and 44b may be manufactured, e.g., by removing the material layer 38 and possibly the electrically conductive element(s) 22 in certain regions so that the fluid 24 may flow to the porous structure 22 and/or the fluid 26 may flow away from the porous structure 22. Remaining regions of the material layer 38 may be used as a heating body.

Although a thermal coupling of the electrically conductive element 32 by means of the material layer 38 may be reduced compared to a thermal coupling as described in connection with FIG. 3e, arranging the electrically conductive element 32 at the material layer enables more degrees of freedom during manufacturing the apparatus 40. For example, any structure of the electrically conductive element(s) 32 may be created in this way. In particular, arranging the material layer 38 enables a planar arrangement of the electrically conductive element(s) 32 with respect to the porous structure 22.

In other words, the heating element is formed by planar metal structures (electrically conductive elements 32) which are applied onto the porous 3D structure 22 after depositing the passivation layer and an optional planarization of the same. Compared to a contacting of the porous structure 22 by means of the heating body described in FIGS. 3*a-e*, thermal coupling to the porous 3D structure 22 may be decreased, while an insulation from the carrier substrate 12 is still present without having to remove the carrier substrate on the rear side. This may result in an increased number of degrees of freedom with respect to the substrate material, the geometry of the heater and the temperature sensor as well as the arrangement of inlet and outlet, i.e., the fluidic terminals 44*a* and 44*b*. A thermal conductivity of the porous structure 22 may be low compared to a thermal conductivity of a material of which the particles are composed. A large-area arrangement of heating bodies, e.g., by the heating body 36 or the material layer 38 between the fluidic terminals 44*a* and 44*b*, enables a high transfer of heat energy towards the porous structure 22 (increase in temperature of the same) or towards the electrically conductive element 32 (sensing the temperature of the porous structure 22).

The material layer 38 and/or the electrically conductive element 32 may also be arranged along lateral regions of the substrate 12 which are arranged outside of the recess 14. For example, this allows heating the surrounding substrate 12 or sensing a temperature of surrounding regions, e.g., when a thermal insulation of the substrate 12 from neighboring regions is not necessary.

In other words, FIGS. 3*a-e* and 4*a-f* describe possibilities for integrating heating elements and temperature sensors as well as fluidic terminals with a porous 3D body for manufacturing miniaturized reaction chambers having a large inner surface. For example, the reaction chamber may be formed by the mutually joined hollow spaces between the particles of the porous structure 22 and, possibly, further non-coated particles.

Arranging a heating element, or a heating body, or a temperature sensor is advantageous compared to entirely coated porous structures as known from WO 2012/104106 A1 since process parameters may be accurately influenced and/or tracked with a high precision so that an accurate process control is possible.

Figure 5:
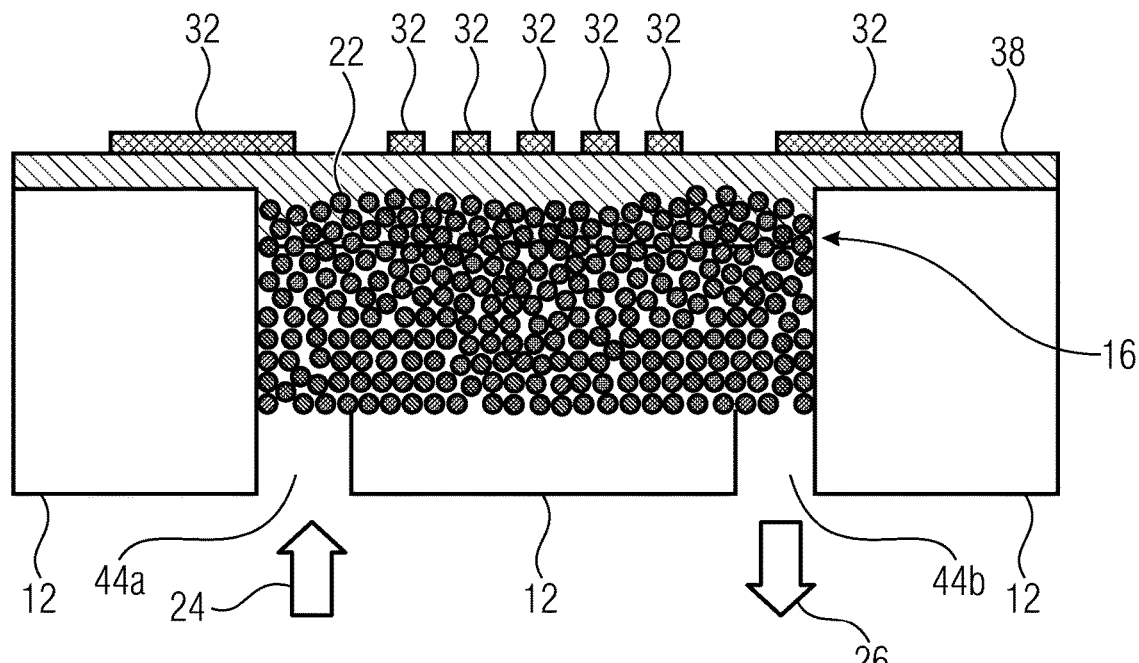
FIG. 5 shows a schematic sectional side view of an apparatus, in which the fluidic terminals are passed through the substrate, according to an embodiment.

FIG. 5 shows a schematic side sectional view of an apparatus 50, wherein, compared to the apparatus 40 of FIG. 4*f*, the fluidic terminals 44*a* and 44*b* are guided through the substrate 12. The material layer 38 may be arranged in a large area so that the same covers the porous structure 22 to a higher extent. This enables arranging the electrically conductive element(s) 32 at a larger area. Alternatively or additionally, further fluidic terminals may be arranged, wherein the further fluidic terminals may also be guided through the material layer 38.

For example, the fluidic terminals 44*a* and/or 44*b* may be created by dry-etching. For this purpose, a lacquer mask may be arranged at the substrate 12, influencing a dimension of the fluidic terminals 44*a* and 44*b*.

By further measures, the surface of the above-described porous MEMS structures may be selectively functionalized for different applications both after finishing and also during the manufacturing process. For example, additional layers may be deposited by means of ALD or comparable methods such as MLD. ALD enables the deposition of many metal oxides, but also metal nitrides and noble metals such as ruthenium or platinum. MLD enables the deposition of hybrid organic-inorganic layers. The wetting behavior of the surface may be set by a corresponding, advantageously wet-chemical, treatment. For example, an MEMS structure as illustrated in FIG. 5 may be used, e.g., as a chromatographic column after the surface of the porous structure 22 has been hydrophobized. Furthermore, the MEMS structure 50 may also be used as a chromatographic column when the same is embodied without the electrically conductive elements 32. Heating the particles for releasing the substances bound at the particles may be take place from the outside.

This means that the first portion 16 of the particles is covered by a thermally conductive layer (material layer 38). One or several heating elements (electrically conductive element 32) is/are joined to the first portion 16 by means of the material layer 38. The heating element(s) is/are configured to heat the material layer 38, the heat energy being at least partially passed on to the first portion 16 of the particles in order to heat the same. An increase in temperature of the particles achieved in such a way may be larger than an increase in temperature of the substrate 12, which means that a thermally reduced coupling or even a decoupling of the shown substrate 12 from further regions of the substrate may be obtained.

Before or after the coating, the multitude of particles may include a concentrator material or several concentrator materials which is/are configured to bind at least a substance from the surroundings of the recess. For example, the uncoated particles, or at least parts thereof, may be composed of the concentrator material. Alternatively or additionally, the coating may also include the concentrator material.

Upon heating the particles based on the heating element(s), the substance bound from the environment may be released based on the increase in temperature.

Alternatively or additionally, the apparatus 50 may be used as a chromatographic column, and may be arranged, e.g., adjacent to an apparatus 10, 20, 30 or 30' operated as a pre-concentrator. Materials (bound substances) released by the pre-concentrator may reach the particles of the apparatus of the chromatographic column (e.g., the apparatus 50) through the fluidic terminals and be analyzed. For example, the pre-concentrator and the chromatographic column may be arranged on or at a mutual substrate or chip. Simply put, the apparatus 50 may be used as a chromatographic column and a pre-concentrator may be connected in series.

Furthermore, a multitude (i.e., two or more) of pre-concentrators may be combined with a chromatographic column, wherein at least one pre-concentrator may include particles and/or concentrator materials for concentrating at least two substances. At least one pre-concentrator may include a further recess with further particles so that a first substance may be concentrated in a first recess, and a second substance may be concentrated in a second recess.

In other words, a chromatograph may enable a separation of different substances in a mixture, wherein the substances are adsorbed by the at least one concentrator material to a varying extent and, accordingly, pass the column of the chromatograph with different speeds.

The at least one concentrator material may be configured to adsorb one or several substances as completely as possible and to then abruptly release the same in order to supply them to the chromatographic column in which a separation takes place. The concentrator my increase the concentration of the substances to be detected in the gas which passes the column. This is advantageous in a low separation performance, e.g., of micro-mechanical columns. A further advantage is the general increase of the detection limit (i.e., the minimal concentration which may be verified in a gas).

Figure 6:
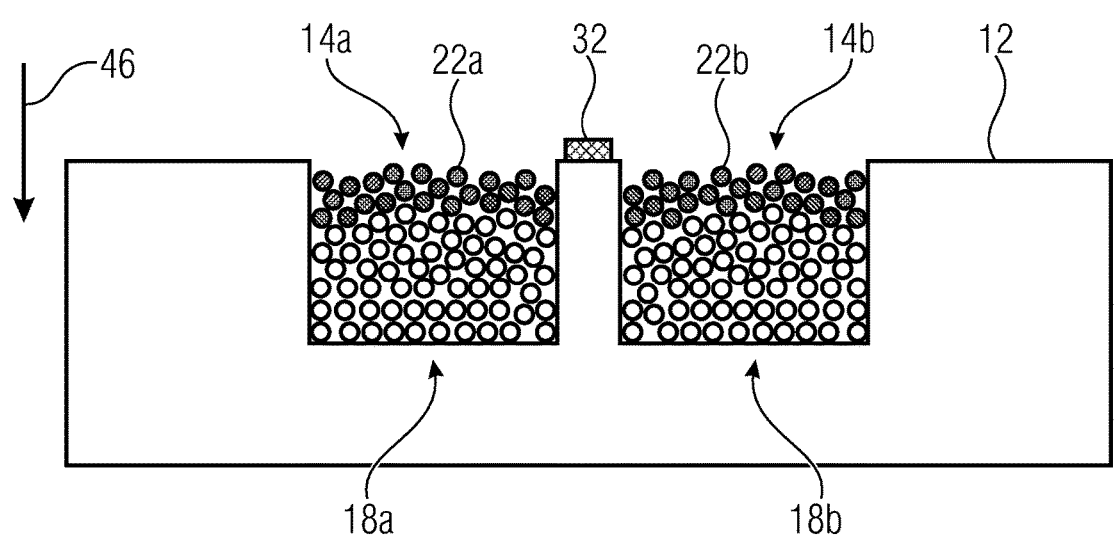
FIG. 6 shows a schematic sectional side view of an apparatus, in which the step of coating described in connection with FIG. 3d is performed such that only a part of the particles on the side facing the opening is coated, according to an embodiment.

FIG. 6 shows a schematic sectional side view of an apparatus 60 as may be obtained when the coating described in connection with FIG. 3*d* is performed such that, by coating the particles up to the penetration depth 21, a sufficient number of particles is coated and the porous structures 22a and/or 22b comprise(s) a sufficient extension along a depth direction 46 from the opening of the recess 14a and 14b, respectively, towards an opposite side of the substrate 12. Simply put, the extension of the porous structures 22a and 22b increases with an increasing penetration depth (possibly dwell time of reactants and/or coating duration) and along the depth direction 46. As described in connection with FIG. 1, the porous structures 22a and 22b may be understood as stiff porous membranes. The particles of the second portions 18a and 18b may be present as loose uncoated particles so that the surface characteristic, or material characteristic, of the particles of the second portions 18a and 18b, respectively, is decisive for the respective reaction of the apparatus 60 or at least contributes to the same.

Figure 7:
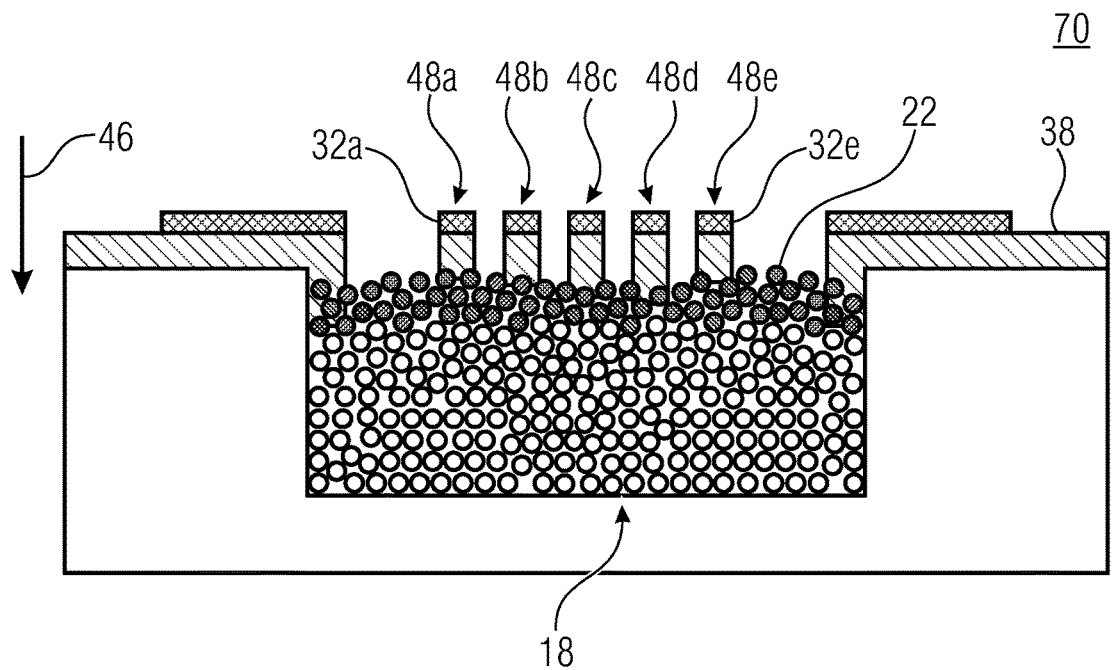
FIG. 7 shows a schematic sectional side view of an apparatus, in which the step of coating, as described in connection with FIG. 4c, is performed such that only a part of the particles is coated on the side facing the opening, according to an embodiment.

FIG. 7 shows a schematic sectional side view of an apparatus 70, e.g., as may be obtained when coating, as described in connection with FIG. 4, is performed such that the porous structure 22 comprises a sufficient extension along the depth direction 46 due to coating the particles up to the penetration depth 21. Furthermore, compared to the apparatus 40 of FIG. 4f, the material layer 38 and electrically conductive elements 32a-e may comprise further openings so that a multitude of fluidic openings is created, or a large-area penetration of the porous structure 22 by the fluid is enabled. The electrically conductive elements 32a-e may each be arranged at a section of the material layer 38, and may form a heating element 48a-e with the same.

In other words, for some applications is it advantageous to at least partially maintain the original surface of the particles, or their physical or chemical characteristic. However, in the steps or processes described in FIGS. 2, 3a-f, 4a-e and 5, the introduced particles are for the most part or entirely coated, or joined to each other, i.e., possibly up to the bottom of the cavity (recess). If the coating process is modified (in particular the dwell time of the reactants), it may be achieved that the introduced particles are coated only up to a certain depth.

The non-coated, i.e., loose particles, may be prevented from falling out by joining the porous structure to the substrate 22, or by preventing a release of the porous structure 22 from the substrate. In this way, it may be achieved that materials in powdered form, i.e., the second portion of the particles, may be enclosed in a miniaturized container, i.e., the recess, such that the particles remaining uncoated may interact with the surrounding medium through the hardened region. The manufacturing process partially corresponds to processes as described in connection with FIGS. 3a-e and 4a-f, however, the difference is that the introduced particles are only superficially coated in the corresponding steps. In order to prevent a premature interaction of the reactive particles with the surroundings, ALD processes may be used, which also comprise a high effectiveness at low temperatures, as is the case for $Al_2O_3$, for example.

FIGS. 6 and 7 show the at least partially finished MEMS structures which are analogous to FIGS. 3d and 4f, respectively. In both cases, the contact between the uncoated particles and a surrounding area of the recess is only possible through the porous membrane. For example, removing the carrier substrate as described in connection with FIG. 3e is omitted. Thus, the embedded heaters 48a-e may remain connected to the carrier substrate. As described above, a thermal decoupling between the heating elements 48a-e and other regions of the substrate 12 may be achieved by additional process steps. Alternatively or additionally, the apparatuses 60 and/or 70 may further comprise fluidic terminals through the substrate 12 towards the particles of the second portion 18, or 18a and/or 18b, respectively. Alternatively or additionally, the second portion 18, or 18a and/or 18b, respectively, may be partially coated through a fluidic terminal in order to obtain a further porous structure in the region of the fluidic terminal and to prevent a leaking of the second portion of the particles through the fluidic terminal in this way.

For example, the particles may be an adsorbent in a powdered form, such as a carbopack, or other particles. For example, using a carbopack, a MEMS structure may be used as a pre-concentrator for a miniaturized gas chromatograph. By sequentially filling neighboring cavities with different adsorbents, an adsorber array may be realized. A thermal insulation of neighboring cavities and/or independently heating the particles in the respective cavities independently enable essentially independently heating the individual array elements, enabling an analysis of complex fluid mixtures.

Alternatively or additionally, a chemical reaction may be triggered with the substances (particles) enclosed in the respective micro-container. For example, a corresponding chemical reaction may be obtained by a selective contact with moisture, or liquids, or gasses. For example, in this way, electric energy may be obtained based on a chemical reaction, e.g., when an above-described apparatus is used as a battery such as a zinc-air battery, which is activated by a supply of an alkaline electrolyte. This means that the multitude of particles may be configured to bind at least one substance and to chemically or physically react the substance with a medium brought in connection or in contact with the multitude of particles.

A further application of the structures illustrated in FIGS. 6 and 7 is in the area of miniaturized getter pumps. For example, titanium (Ti)-based getters and zirconium (Zr)-based getters are known, which may be used in the form of applied layers. Compared to a planar arrangement, an effective surface of the getter materials may be increased by means of the apparatuses described in FIGS. 6 and 7, which leads to small construction space requirements for the getter material and/or to decreased space or surface requirements of the getter on the substrate.

Figure 8:
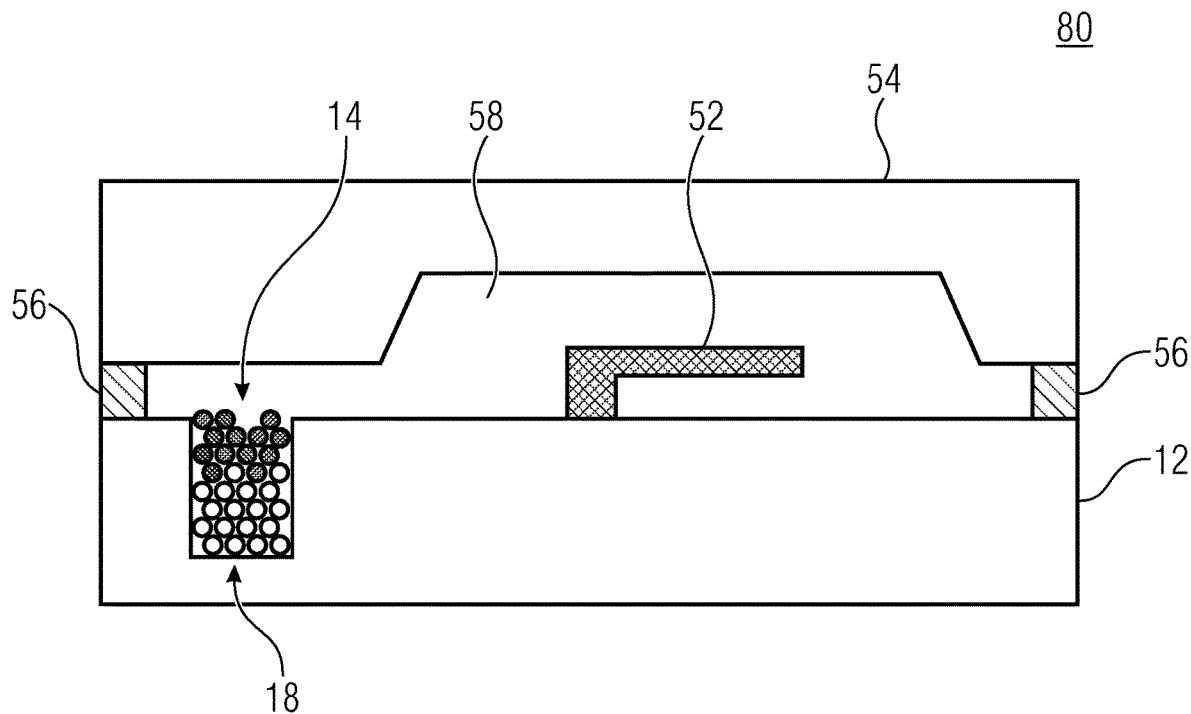
FIG. 8 shows a schematic sectional side view of an apparatus, in which a second portion of the particles may be used as a getter pump, according to an embodiment.

FIG. 8 shows a schematic sectional side view of an apparatus 80, in which the second portion 18 of the particles may be used as a getter pump. The apparatus 80 includes the substrate 12, into which the recess 14 is introduced. For example, the substrate 12 may be a MEMS wafer. The apparatus 80 further includes a MEMS structure 52 which is arranged at the substrate 12 and provides a MEMS function. For example, the MEMS structure may be a seismic mass so that the apparatus 80 may be used as an inertial sensor. Alternatively, the MEMS structure may also be an actuator or a sensor.

A cap structure 54 is arranged at the substrate 12. The cap structure 54 may be joined to the substrate 12 by means of a seal 56. The seal 56 may be an adhesive (glue) or the like, with which the cap structure 54 and the substrate 12 are adhered to each other. Alternatively, the cap structure 54 and the substrate 12 may also be bonded to each other.

The substrate 12, the cap structure 54 and the seal 56 enclose the MEMS structure 52 so that an inner volume (cavity) 58 of the apparatus 80 is created in which the MEMS structure 52 is arranged. The opening of the recess 14 borders on the cavity 58 of the apparatus 80. At least a second portion 18 of the particles is configured to bind a fluid (e.g., air) located in the cavity 58 in order to generate a vacuum or at least a negative pressure in the cavity 58. Alternatively, the second portion 18 of the particles may be configured to extract a certain substance from the cavity, e.g., to decrease corrosion or other interactions between the substance and the MEMS structure 52.

For example, the cap structure 54 may be formed of the same material as the substrate 12. Simply put, the cap structure 54 may be a further substrate.

This means that the multitude of particles may be configured to bind gas molecules. Thus, the cavity may be sealed against a surrounding area of the apparatus 80. The multitude of particles may be configured to bind gas molecules which are arranged in the cavity after sealing so that a gas pressure inside of the cavity is reduced with respect to a gas pressure outside of the apparatus 80.

Figure 9A:
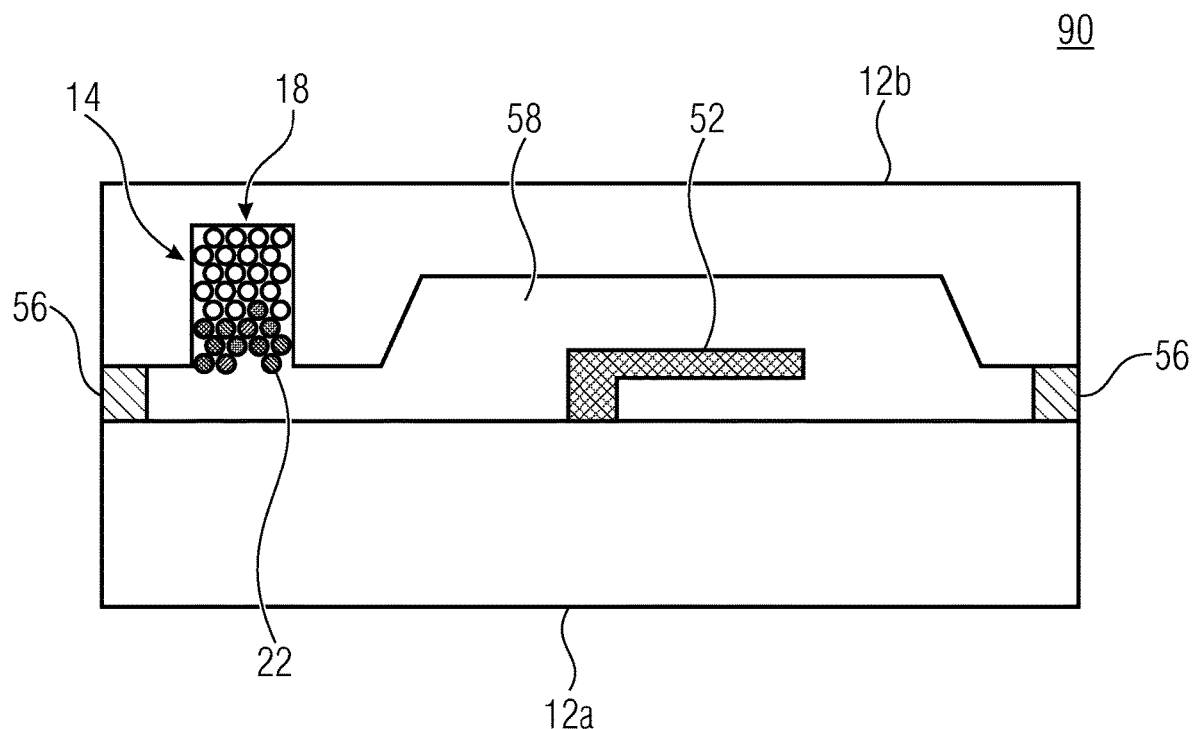
FIG. 9a shows a schematic sectional side view of an apparatus, which is modified with respect to the apparatus of FIG. 8 such that a cap structure comprises a recess, according to an embodiment.

FIG. 9a shows a schematic sectional side view of an apparatus 90, which is modified compared to the apparatus 80 such that the cap structure is formed by a substrate 12b comprising the recess 14. Simply put, the cap structure is a substrate and comprises the getter pump. Mechanically joining the porous structure 22 and the substrate 12b in a fixed manner enables preventing the second portion 18 from trickling out of the cavity 14. For example, the apparatus 90 may be positioned in the space such that the gravitational force pulls the particles of the second portion 18 towards the cavity 58. For example, the porous structure 22 may be mechanically joined in a fixed manner to the substrate 12b by means of the coating. Alternatively, the porous structure 22 may, e.g., be pushed (pressed) into the opening of the recess 14 so that the resulting mechanical forces prevent the porous structure 22 from falling out of the recess 14.

Figure 9B:
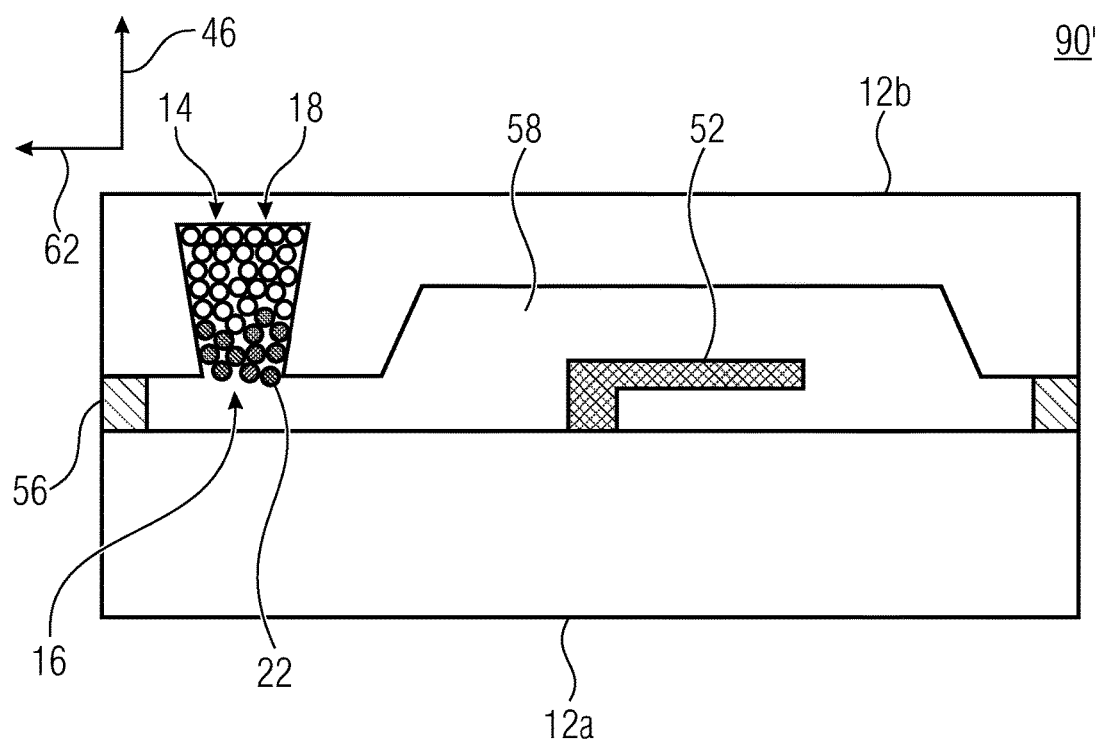
FIG. 9b shows a schematic sectional side view of an apparatus, which is modified with respect to the apparatus of FIG. 9a such that recess comprises a variable width along a depth direction, according to an embodiment.
Figure 10:
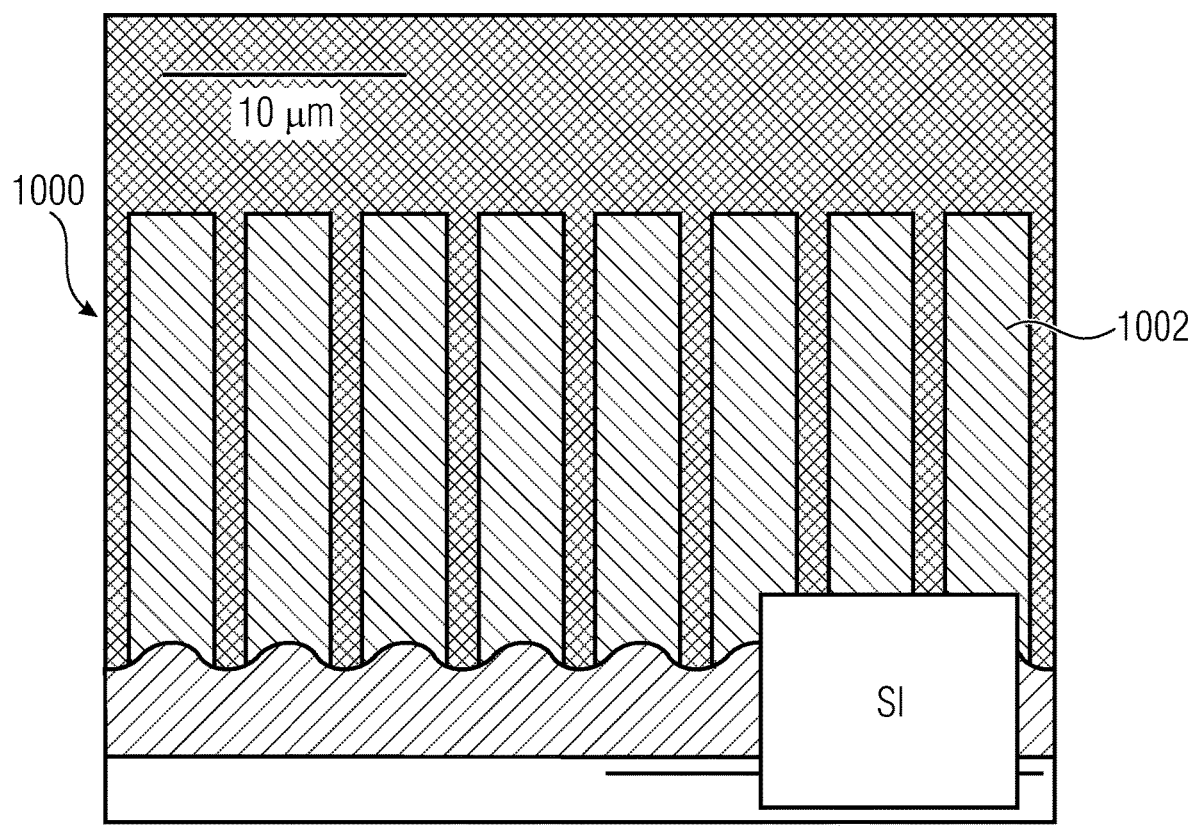
FIG. 10 shows an array of columns, e.g., as may be used as a chromatographic separation column, according to the conventional technology.
Figure 11:
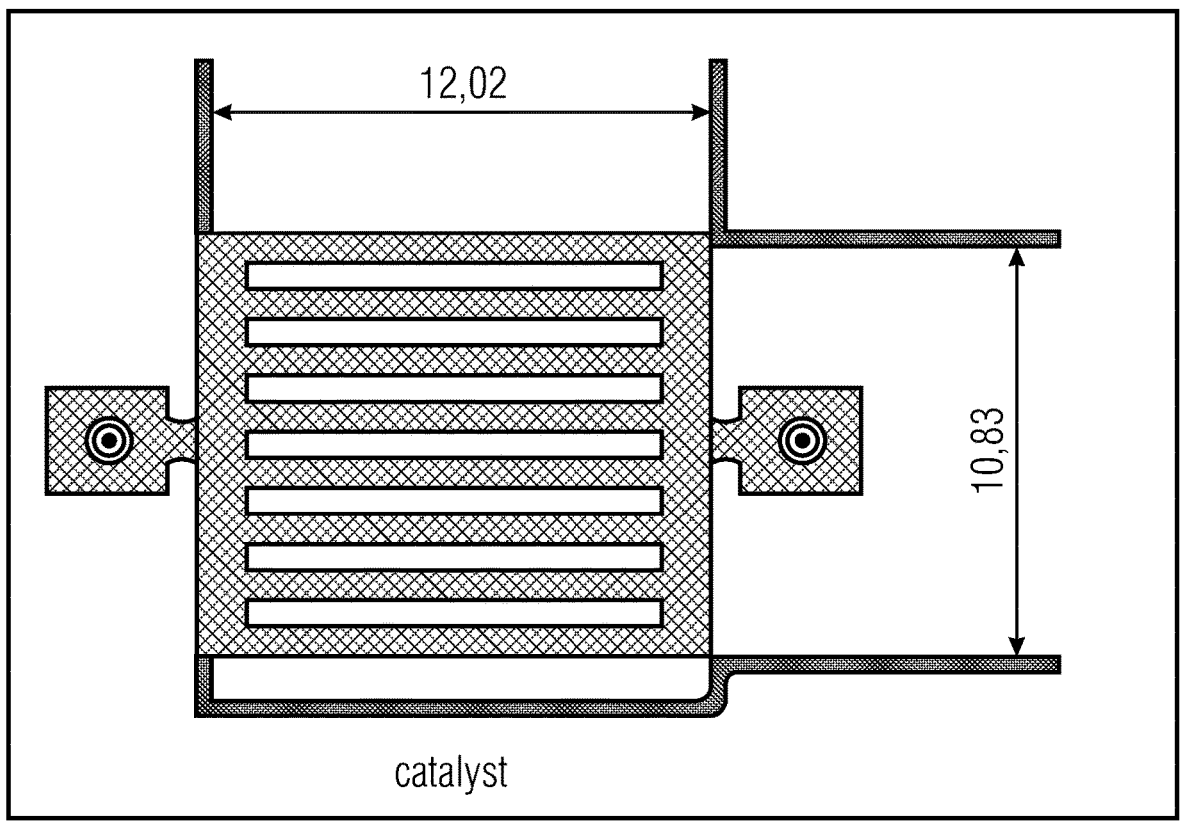
FIG. 11 shows a silicon chip with an etched channel structure according to the conventional technology.
Figure 12:
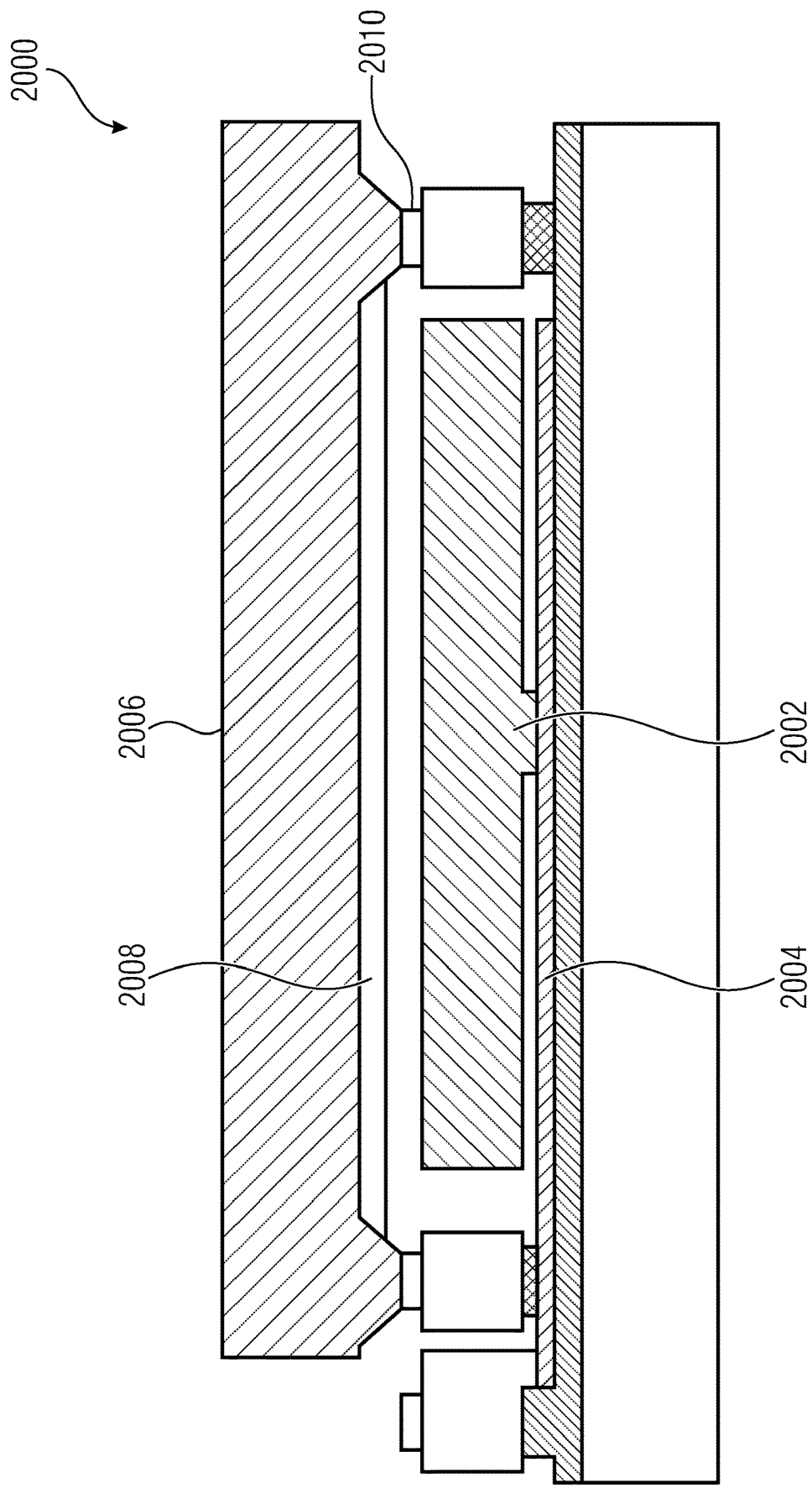
FIG. 12 shows a manufacturing process for polysilicon-based inertial sensors according to the conventional technology.
Figure 13A:
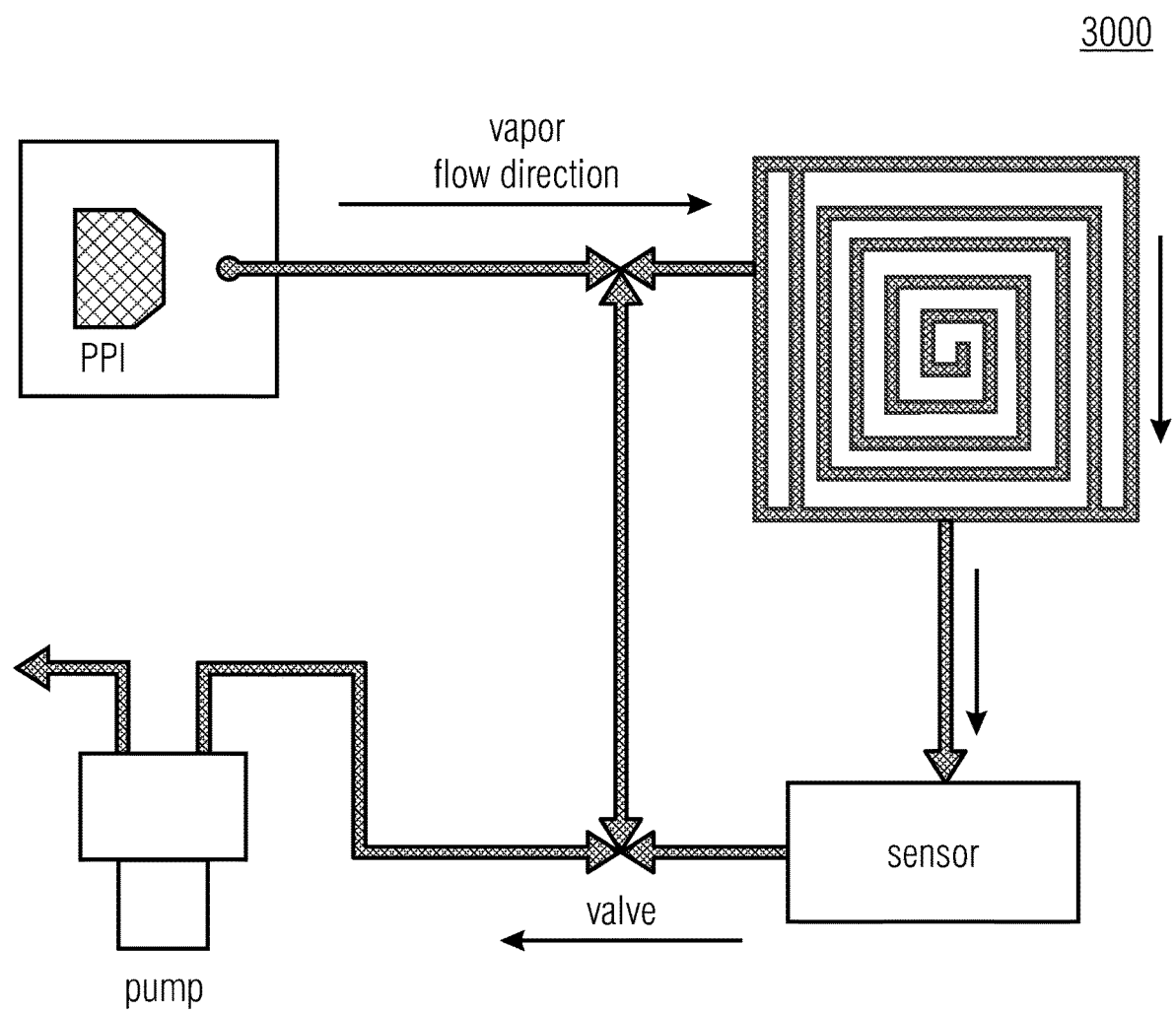
FIG. 13a shows a schematic block circuit diagram of a miniaturized gas chromatograph according to the conventional technology.
Figure 13B:
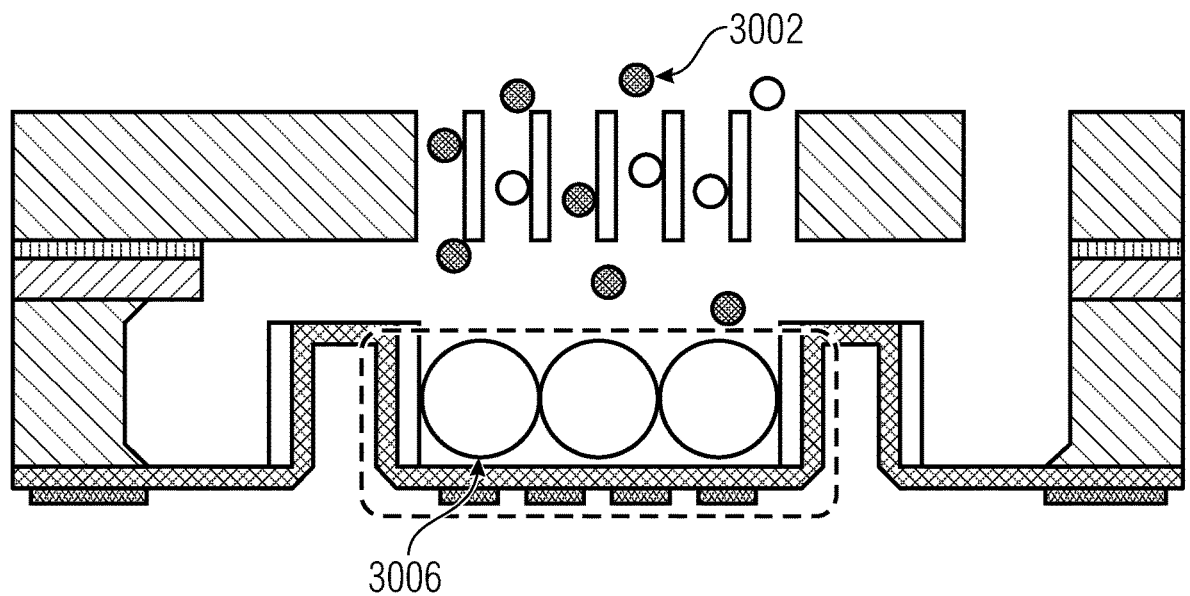
FIG. 13b shows a schematic cross-section for illustrating an absorption of vapor according to conventional technology.
Figure 13C:
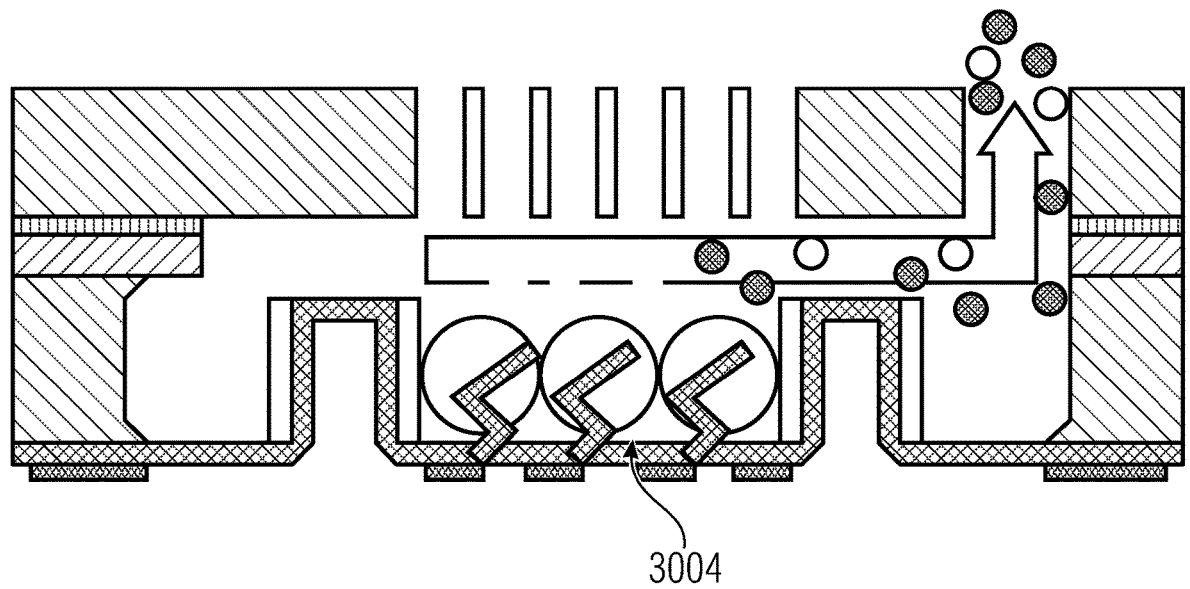
FIG. 13c shows a schematic cross-section of the functional principle of releasing the previously adsorbed particles of the vapor according to the conventional technology.

FIG. 9b shows a schematic sectional side view of an apparatus 90', which is modified compared to the apparatus 90 of FIG. 9a such that the recess 14 comprises a variable dimension along a lateral direction 62 perpendicular to the depth direction 46. The recess 14 is configured such that it tapers towards the cavity 58. The porous structure 22 may comprise a dimension along the lateral direction 62 which is larger than or equal to the dimension of the opening of the recess 14 along the lateral direction 62.

Based on the tapering of the recess 14, it is made possible to prevent the porous structure 22 from falling out of or passing through the opening of the recess 14. Thus, fixing the porous structure 22 to the substrate 12b when by means of the coating may be omitted. A movement of the porous structure 22 may be prevented or at least restricted in a direction parallel to the depth direction 46 by the second portion 18 of the particles and in an opposite direction by the tapering of the recess 14. With a same volume of the recess 14, a dimension of the opening of the recess may be reduced. Compared to the apparatus 90, the getter pump, i.e., the second portion 18, may be arranged in a larger volume even if a number of coated particles, i.e., of the first portion 16, is the same or is reduced. This enables a high capacity of the getter pump, i.e., a large amount of a fluid or a substance may be sucked out (bound) from the cavity 58.

In other words, FIGS. 8, 9a and 9b show a simple possibility for integrating a particle-based getter pump into a MEMS system. The getter pump (i.e., the getter function) may be activated by heating the particles from the outside. Alternatively, it is also conceivable that the apparatus 80, 90 or 90' comprises a heating element and/or a heating body in order to be activated independently of external temperatures. The getter activation may take place by tempering after the wafer bonding. A getter pump having an integrated heater which is thermally insulated from the substrate, as described for preceding embodiments, may enable repeated getter activation on the chip level without heating the entire MEMS system. Due to the large area and the large volume of the particles enclosed in the cavity, a substantially larger absorption capability is enabled compared to planar structures, in particular thin getter layers.

Although heating elements and/or a heating body have been described in the preceding embodiments such that they are arranged adjacent to or at the porous structure, it is also conceivable that a heating element and/or a heating body is/are surrounded by uncoated particles.

Alternatively or additionally, one or several further sensors may be arranged with respect to the recess 14 and/or the cavity 58. The sensors may be configured to sense a parameter of the multitude of particles (such as a temperature, a pressure or a movement), a parameter of the cavity (such as a temperature, a fill level which the fluid in the cavity comprises), a type of the medium with which the cavity 14 is at least partially filled, or the like. Alternatively or additionally, a sensor may be configured to sense a parameter of the medium, i.e., the fluid, which is arranged between the multitude of particles. For example, this may be a flow speed, a pressure, a temperature or a condition (e.g. alkaline or acidic) of the fluid.

An apparatus according to the above-described embodiments may further comprise an electrode structure which is in contact with the first portion and/or the second portion of the particles and which is configured to apply or sense an electric potential between electrodes of the electrode structure, which means that an electric potential may be generated or sensed at or between the particles.

Embodiments described above are independent from a size (e.g., diameter or lateral dimension). For example, if the particles are embodied as aluminum oxide particles (splitter), they may comprise a diameter of, e.g., between 1 and 20 µm, between 2 and 15 µm, or between 5 and 12 µm. For example, if silicon particles are used, they may comprise a diameter or a lateral dimension in a range of 0.1 µm to 20 µm, 0.5 µm to 5 µm or 0.8 µm to 1.2 µm.

Although above-described embodiments have been described such that the porous structure comprises hollow spaces which are at least partially joined to each other so that the porous structure 22 forms a porous membrane, it may be achieved by means of the coating, in particular with a particle size of <2 µm, that the porous structure 22 is sealed, i.e., the hollow spaces between the particles are closed. In this way, a recess may also be closed by means of the coating.

Although above described embodiments have been described such that the substrate comprises a flat shape, the substrate may also comprise other shapes. For example, the substrate may comprise an arched shape (such as a cupola structure) or, in certain regions, a planar and/or bent shape.

Even though some aspects have been described within the context of an apparatus, it is understood that said aspects also represent a description of the corresponding method, so that a block or a structural component of an apparatus is also to be understood as a corresponding method step or as a feature of a method step. By analogy therewith, aspects that have been described within the context of or as a method step also represent a description of the corresponding block or detail or feature of a corresponding apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] K. Takatsuki et al. "MEMS LC microchip with low dispersion and low pressure drop turn structure using distribution controlled micro pillar array", Proc. MEMS 2013, Taipei, Taiwan, Jan. 20-24, 2013, 981-984
[2] F. Saharil et al., "Dry transfer bonding of porous silicon membranes to OSTE+ polymer microfluidic devices", Proc. MEMS 2012, Paris, France, Jan. 29-Feb. 2, 2012, 232-234
[3] Y. Suzuki et al., "Development of micro catalytic combustor with Pt/$Al_2O_3$ thin films", JSME, B, Vol. 47, No. 3, 2004, 522-527
[4] P. Merz et al., "PSM-X2: Polysilicon surface micromachining process platform for vacuum-packaged sensors". Konferenzband Mikrosystemtechnik-Kongress 2005, Freiburg, Germany, Oct. 15-17, 2005, 467-470
[5] J. H. Seo et al., "Thermal desorption/injection characterization of a microfabricated passive preconcentrator/injector for micro gas chromatography", Proc. ITHERM 2012, San Diego, Calif., US, May 30-Jun. 1, 2012
[6] B. Alfeeli, M. Agah, "Micro preconcentrator with embedded 3D pillars for breath analysis applications", Proc. SENSORS 2008, Leece, Italy, 26-29 Oct. 2008, 736-739

The invention claimed is:

1. An apparatus comprising:
a substrate comprising a recess; and
a multitude of particles arranged in the recess;
wherein a first portion of the particles is joined to form a porous structure by means of a coating, and wherein a second portion of the particles is not joined by means of the coating; and
wherein the first portion of the particles is arranged closer to an opening of the recess than the second portion of the particles so that a leaking of the second portion of the particles from the recess through the opening is prevented;
wherein the particles of the second portion are configured to react with a fluid and/or to bind the fluid or a substance thereof;
wherein the second portion comprises a number of particles which is greater than a number of particles of the first portion by a factor of at least 1.1; and
wherein the apparatus comprises at least one electrode structure which is in contact with the multitude of particles and is configured to sense an electric potential of the particles in contact with the electrode structure, or to apply the electric potential to the particles in contact with the electrode structure; or
wherein a catalytically active substance is arranged on a surface of the porous structure, the porous structure being configured to perform a catalyst function.

2. The apparatus according to claim 1, which is a reactor for a chemical process or a physical process and which is formed as at least one of a pre-concentrator, a filter, an apparatus for generating energy and a getter pump.

3. The apparatus according to claim 1, wherein a multitude of hollow spaces is arranged between the particles of the first portion of the particles, the hollow spaces being at least partially joined to each other, and the porous structure being immovably joined to the substrate.

4. The apparatus according to claim 1, wherein the porous structure is a porous membrane, and wherein an interaction of the second portion of the particles with a medium arranged in a surrounding area outside of the recess is enabled through the porous membrane and is essentially prevented through other regions.

5. The apparatus according to claim 1, wherein the substrate comprises a further recess in which a further multitude of particles is arranged;
wherein a first portion of the further multitude of particles is joined to a further porous structure by means of a further coating arranged with respect to the first portion of the further multitude of particles, and wherein a second portion of the further multitude of particles is not joined by means of the further coating; and
wherein the first portion of the further multitude of particles is arranged between the second portion of the further multitude of particles and a surrounding area of the further recess and is configured to essentially prevent a movement of the second portion of the further multitude of particles towards the surrounding area of the further recess.

6. The apparatus according to claim 1, wherein the opening of the recess borders on a cavity of the apparatus.

7. The apparatus according to claim 6, wherein the cavity is formed by the substrate and a further substrate arranged at the substrate.

8. The apparatus according to claim 1, further comprising a heating element arranged with respect to the multitude of particles and configured to heat the multitude of particles.

9. The apparatus according to claim 8, wherein the first portion of the particles is covered by a thermally conductive layer, wherein the heating element is joined to the first portion by means of the thermally conductive layer, wherein the heating element is configured to heat the thermally conductive layer which is configured to heat the first portion of the particles, and wherein an increase in temperature of the particles is larger than an increase in temperature of the substrate.

10. The apparatus according to claim 8, wherein the multitude of particles comprises a concentrator material configured to bind at least one substance from a surrounding area of the recess.

11. The apparatus according to claim 10, wherein the multitude of particles are configured to release the substance bound from the surrounding area based on the heating.

12. An apparatus comprising:
a substrate;
a multitude of particles joined to form a porous structure by means of a coating, the porous structure being immovably joined to the substrate; and
a heating element configured to heat the multitude of particles;
wherein
the apparatus comprises a heating body spaced apart from the substrate by the multitude of particles, wherein the heating element is arranged at the heating body and is configured to heat the heating body so that the heating body heats the multitude of particles or
wherein the porous structure is at least partially covered by a thermally conductive layer, wherein the heating element is arranged at the thermally conductive layer and is configured to heat the multitude of particles by heating the thermally conductive layer; and
the apparatus further comprising at least one electrode structure which is in contact with the multitude of particles and is configured to sense an electric potential of the particles in contact with the electrode structure, or to apply the electric potential to the particles in contact with the electrode structure; or wherein a catalytically active substance is arranged on a surface of the porous structure, the porous structure being configured to perform a catalyst function.

13. The apparatus according to claim 12, wherein
a first portion of the particles is joined to form the porous structure by means of the coating, and wherein a second portion of the particles is not joined by means of the coating; and
wherein the first portion of the particles is arranged closer to an opening of a recess of the substrate than the second portion of the particles so that a leaking of the second portion of the particles from the recess through the opening is prevented.

14. The apparatus according to claim 1, wherein the apparatus is a micro-mechanical structure.

15. The apparatus according to claim 12, wherein the apparatus is a micro-mechanical structure.

16. The apparatus according to claim 1, wherein the porous structure is configured to be permeable for a fluid.

17. The apparatus according to claim 12, wherein the porous structure is configured to be permeable for a fluid.

18. The apparatus according to claim 1, further comprising a sensor element arranged adjacent to the multitude of particles and configured to sense a parameter of the multitude of particles, a parameter of a cavity of the apparatus and/or a parameter of a medium arranged between the multitude of particles.

19. The apparatus according to claim 12, further comprising a sensor element arranged adjacent to the multitude of particles and configured to sense a parameter of the multitude of particles, a parameter of a cavity of the apparatus and/or a parameter of a medium arranged between the multitude of particles.

20. The apparatus according to claim 1, wherein the multitude of particles is configured to bind at least one substance and to cause the substance to react chemically or physically with a medium brought in contact with the multitude of particles.

21. The apparatus according to claim 12, wherein the multitude of particles is configured to bind at least one substance and to cause the substance to react chemically or physically with a medium brought in contact with the multitude of particles.

22. The apparatus according to claim 1, wherein the multitude of particles is configured to bind gas molecules, wherein the recess is joined to a cavity of the apparatus via the opening, wherein the cavity is sealed against a surrounding area of the apparatus, and wherein the multitude of particles is configured to bind gas molecules remaining in the cavity so that a gas pressure inside of the cavity is reduced with respect to a gas pressure outside of the cavity.

23. The apparatus according to claim 12, wherein the multitude of particles is configured to bind gas molecules, wherein a recess of the substrate is joined to a cavity of the apparatus via an opening, wherein the cavity is sealed against a surrounding area of the apparatus, and wherein the multitude of particles is configured to bind gas molecules remaining in the cavity so that a gas pressure inside of the cavity is reduced with respect to a gas pressure outside of the cavity.

24. The apparatus according to claim 1, wherein a material of the substrate comprises one of a semiconductor material, a glass material, a ceramic material, a glass-ceramic material and a plastic material.

25. The apparatus according to claim 12, wherein a material of the substrate comprises one of a semiconductor material, a glass material, a ceramic material, a glass-ceramic material and a plastic material.

26. The apparatus according to claim 1, wherein a reaction characteristic of the first or second portions of the multitude of the particles is influenced by a material or a surface characteristic of the particles.

27. The apparatus according to claim 13, wherein a reaction characteristic of the first or second portions of the multitude of the particles is influenced by a material or a surface characteristic of the particles.

28. The apparatus according to claim 1, wherein a material characteristic or a surface characteristic of the first portion of the particles is influenced, enabled or suppressed by the coating.

29. The apparatus according to claim 12, wherein a material characteristic or a surface characteristic of the multitude of the particles is influenced, enabled or suppressed by the coating.

30. The apparatus according to claim 1, wherein a layer is arranged at the porous structure, the layer providing functionalization of the porous structure.

31. The apparatus according to claim 12, wherein a further layer is arranged at the porous structure, the further layer providing functionalization of the porous structure.

32. An apparatus comprising:
a substrate;
a multitude of particles joined to form a porous structure by means of a coating, the porous structure being immovably joined to the substrate; and
a heating element configured to heat the multitude of particles;
wherein the heating element is enclosed by the multitude of particles; and
wherein the apparatus comprises at least one electrode structure which is in contact with the multitude of particles and is configured to sense an electric potential of the particles in contact with the electrode structure, or to apply the electric potential to the particles in contact with the electrode structure; or
wherein a catalytically active substance is arranged on a surface of the porous structure, the porous structure being configured to perform a catalyst function.

* * * * *